(12) United States Patent
Beam, IV

(10) Patent No.: US 10,875,456 B2
(45) Date of Patent: Dec. 29, 2020

(54) CAB GUARD WITH ADJUSTABLE RAILING SYSTEM FOR AERIAL DEVICE

(71) Applicant: Safety Test & Equipment Co., Shelby, NC (US)

(72) Inventor: Dennis Beam, IV, Shelby, NC (US)

(73) Assignee: Safety Test & Equipment Co., Shelby, NC (US)

(*) Notice: Subject to any disclaimer, the term of this patent is extended or adjusted under 35 U.S.C. 154(b) by 342 days.

(21) Appl. No.: 16/108,197

(22) Filed: Aug. 22, 2018

(65) Prior Publication Data

US 2019/0071020 A1 Mar. 7, 2019

Related U.S. Application Data

(60) Provisional application No. 62/554,081, filed on Sep. 5, 2017.

(51) Int. Cl.
*B60R 3/00* (2006.01)
*B66C 23/36* (2006.01)
*B66F 11/04* (2006.01)

(52) U.S. Cl.
CPC .............. *B60R 3/005* (2013.01); *B66C 23/36* (2013.01); *B66F 11/044* (2013.01); *B66C 2700/0357* (2013.01)

(58) Field of Classification Search
CPC ...... B66F 17/00; B66F 17/006; B66F 11/044; B60R 3/005; B66C 23/36; B66C 2700/0357

(Continued)

(56) References Cited

U.S. PATENT DOCUMENTS 4,371,056 A 2/1983 Anglade
4,613,155 A * 9/1986 Greenwood ......... A01C 15/003
105/457

(Continued)

FOREIGN PATENT DOCUMENTS

CN 202954500 5/2013
WO WO-2008121705 A1 * 10/2008 ............. A47B 51/00
WO WO-2016201116 A1 * 12/2016 ............... B66B 9/00

OTHER PUBLICATIONS

Walker, "OSHA Regulations on Collapsible Handrails," Chron, Available online at: http://smallbusiness.chron.com/osha-regulations-collapsible-handrails-10369.html, 3 pages.

*Primary Examiner* — Colleen M Chavchavadze
*Assistant Examiner* — Candace L Bradford
(74) *Attorney, Agent, or Firm* — Kilpatrick Townsend & Stockton LLP

(57) ABSTRACT

An aerial device system includes an adjustable railing and a coupler. The adjustable railing is positionable around at least a portion of a base platform and is movable between a stowed position and a deployed position. A height of the adjustable railing in the deployed position is greater than a height of the adjustable railing in the stowed position. The coupler is communicatively coupled to the adjustable railing and is configured to detect a position of a component of an aerial device of the aerial device system and move the adjustable railing based on the detected position of the component of the aerial device. A method of controlling a cab guard safety system for the aerial device includes detecting the position of the component and moving the adjustable railing to a stowed position or a deployed position based on the detected position of the component.

20 Claims, 9 Drawing Sheets

(58) Field of Classification Search
USPC .................. 182/63.1–69.9, 2.1–2.11, 113
See application file for complete search history.

(56) References Cited

U.S. PATENT DOCUMENTS

| | | | | |
|---|---|---|---|---|
| 4,936,407 | A * | 6/1990 | Brock ................ | B60R 3/005 180/271 |
| 5,634,529 | A | 6/1997 | Nguyen et al. | |
| 5,749,436 | A | 5/1998 | Satchwell, III | |
| 5,921,531 | A * | 7/1999 | Early ................. | B61D 7/00 105/437 |
| 5,992,562 | A * | 11/1999 | Boeckman .......... | B66F 11/042 182/63.1 |
| 6,045,157 | A * | 4/2000 | Poulin ............... | B60R 3/005 182/113 |
| 6,464,037 | B2 | 10/2002 | Baldas et al. | |
| 7,174,993 | B2 | 2/2007 | Lantz | |
| 8,051,951 | B2 * | 11/2011 | Bennett ............. | B61K 13/00 182/39 |
| 8,632,099 | B2 | 1/2014 | Conny et al. | |
| 8,745,799 | B1 * | 6/2014 | Thomasson ......... | B65G 69/22 14/71.3 |
| 9,126,536 | B2 | 9/2015 | Meacham | |
| 9,403,486 | B2 | 8/2016 | May | |
| 9,481,314 | B2 | 11/2016 | Levi | |
| 10,457,506 | B1 * | 10/2019 | Bennett ............. | B65G 69/22 |
| 2002/0079163 | A1 * | 6/2002 | Figura ............... | E06C 7/12 182/2.5 |
| 2002/0189503 | A1 * | 12/2002 | Hansen ............. | B60R 3/005 108/44 |
| 2003/0020253 | A1 * | 1/2003 | Albert Bosman ...... | B60R 3/005 280/164.1 |
| 2004/0173406 | A1 * | 9/2004 | Lantz ................ | E06C 7/006 182/113 |
| 2006/0054392 | A1 * | 3/2006 | MacDonald .......... | B66F 11/04 182/113 |
| 2009/0078502 | A1 * | 3/2009 | Knurr ................ | B64F 5/00 182/13 |
| 2009/0096231 | A1 | 4/2009 | Burlingame | |
| 2010/0294592 | A1 * | 11/2010 | Crook ................ | B66F 11/044 182/113 |
| 2012/0024629 | A1 * | 2/2012 | Berry, Jr. ............ | E04G 1/24 182/113 |
| 2012/0025507 | A1 * | 2/2012 | Berry, Jr. ............ | E04G 1/24 280/769 |
| 2012/0048648 | A1 * | 3/2012 | Meacham ............ | E04G 5/14 182/113 |
| 2013/0119651 | A1 * | 5/2013 | Conny ................ | B60R 21/02 280/837 |
| 2015/0060202 | A1 * | 3/2015 | Fanello .............. | B60R 3/005 182/113 |
| 2015/0246643 | A1 * | 9/2015 | Levi ................. | B60R 9/045 182/113 |
| 2015/0298613 | A1 * | 10/2015 | May ................. | B60R 3/005 182/113 |
| 2016/0129844 | A1 * | 5/2016 | Magnussen .......... | B60R 21/131 280/760 |
| 2017/0313255 | A1 * | 11/2017 | Brett ................ | B60P 3/2205 |
| 2019/0071020 | A1 * | 3/2019 | Beam, IV ........... | B66F 11/044 |
| 2019/0352920 | A1 * | 11/2019 | Salyer ............... | E04G 5/142 |

\* cited by examiner

CAB GUARD WITH ADJUSTABLE RAILING SYSTEM FOR AERIAL DEVICE

REFERENCE TO RELATED APPLICATIONS

This application claims the benefit of U.S. Provisional Application No. 62/554,081, filed on Sep. 5, 2017, and entitled CAB GUARD WITH ADJUSTABLE RAILING SYSTEM FOR AERIAL DEVICES, the disclosure of which is hereby incorporated by reference in its entirety.

FIELD OF THE INVENTION

This application relates to cab guards used for access, inspection, and maintenance of aerial devices, and more particularly to adjustable railing systems for the cab guards.

BACKGROUND

Various industries such as the construction, agriculture, manufacturing, and other industries use aerial devices to provide temporary access to people or equipment to otherwise inaccessible areas high above the ground. Aerial devices typically include a work platform for workers to stand on and a lifting system, such as a boom, for vertically raising and lowering the work platform. Aerial devices may be unpowered, self-propelled, or vehicle-mounted.

With vehicle-mounted aerial devices, oftentimes a cab guard having a base platform is positioned over the body or cab of the vehicle. The cab guard allows for entry to and exit from the work platform, inspection of the work platform, and maintenance on the work platform. Because the base platforms are positioned over the cab of the vehicle, they are commonly elevated at various heights above the ground and require a worker to climb a ladder or other similar device to access the base platform. Conventionally, cab guards do not include any railings or other items projecting upwards from the base platform because such items interfere with the operation of the aerial device, such as during deployment or stowing of the work platform. Therefore, although cab guards provide a convenient area for accessing, inspecting, and performing maintenance on the work platform, they also present a safety hazard to workers who might fall off of the base platform from great heights. Accordingly, there is still a need for a cab guards that provide safety to workers during access, inspection, and maintenance, in particular at elevated heights, while minimally interfering with the operation of the aerial device.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to various examples, an aerial device system includes an adjustable railing and a coupler. The adjustable railing is positionable around at least a portion of a base platform of the aerial device system and is movable between a stowed position and a deployed position. A height of the adjustable railing in the deployed position is greater than a height of the adjustable railing in the stowed position. The coupler is communicatively coupled to the adjustable railing and is configured to detect a position of a component of an aerial device of the aerial device system and move the adjustable railing based on the detected position of the component of the aerial device being in a stowed position for the component or a deployed position for the component.

According to certain examples, an aerial device system includes a base platform and a cab guard safety system. The base platform includes a support surface. The cab guard safety system includes an adjustable railing and a coupler. The adjustable railing extends around at least a portion of the base platform and is movable between a stowed position and a deployed position. A height of the adjustable railing relative to the support surface in the deployed position is greater than a height of the adjustable railing in the stowed position. The coupler is communicatively connected to the adjustable railing and is configured to detect a position of a component of an aerial device of the aerial device system relative to the base platform and move the adjustable railing between the stowed position and the deployed position based on the position of the component of the aerial device.

According to some examples, a method of controlling a cab guard safety system includes detecting a position of a component of an aerial device relative to a base platform of an aerial device system with a coupler. The method also includes moving, by the coupler, an adjustable railing extending along at least a portion of a perimeter edge of the base platform to a deployed position or a stowed position based on the detected position of the component of the aerial device, where a height of the adjustable railing in the deployed position is greater than a height of the adjustable railing in the stowed position.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "forward," "reverse," "up," "down," "top," "left," "right," "front," and "back," among others are intended to refer to the orientation as illustrated and described in the figure (or figures) to which the components and directions are referencing.

In one aspect, disclosed is an aerial device system that includes a cab guard safety system, a base platform, and an aerial device. In some examples, the aerial device system may be vehicle-mounted. In some cases, the base platform and the aerial device are movable as a unit (e.g., both are mounted on a vehicle), although they need not be. In certain aspects, the base platform is a cab guard mounted over a cab of a vehicle. In various examples, the aerial device includes a lift mechanism that is configured to vertically position a work device relative to the base platform. In various cases, the cab guard safety system includes an adjustable railing that is movable relative to the base platform through a coupler. The adjustable railing is movable between a stowed position and a deployed position, and a height of the adjustable railing in the deployed position is greater than the height of the railing in the stowed position. In some cases, the coupler is communicatively coupled to the adjustable railing and is configured to detect a position of a component of aerial device of the aerial device system, such as the lift mechanism or the work device, and move the adjustable railing based on the detected position of the component of the aerial device being in a stowed position for the component or a deployed position for the component. In certain cases, the cab guard safety system includes an alarm system that provides an alert based on a position of the adjustable railing and/or component of the aerial device.

Figure 1:
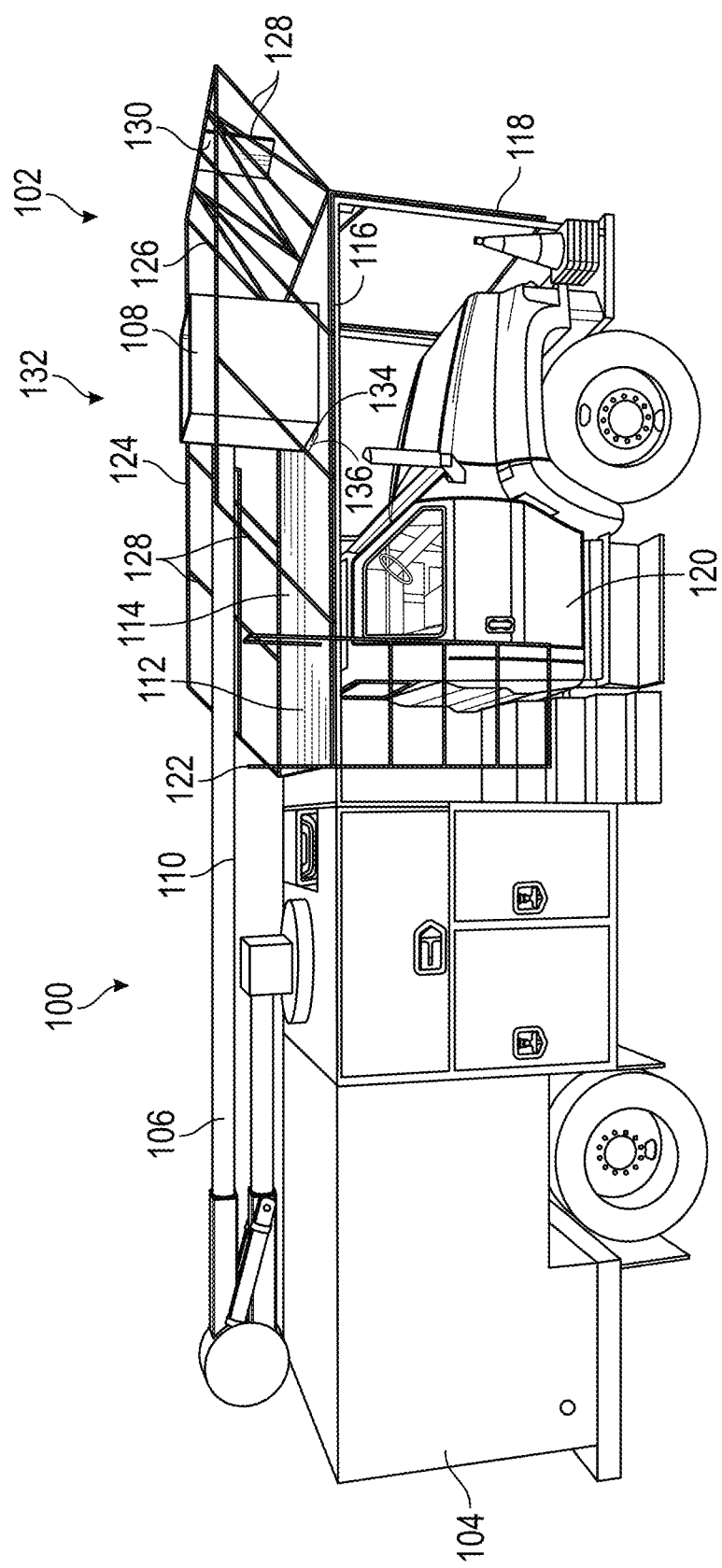
FIG. 1 depicts an example of a vehicle with a cab guard assembly for an aerial device according to aspects of the present disclosure.
Figure 2:
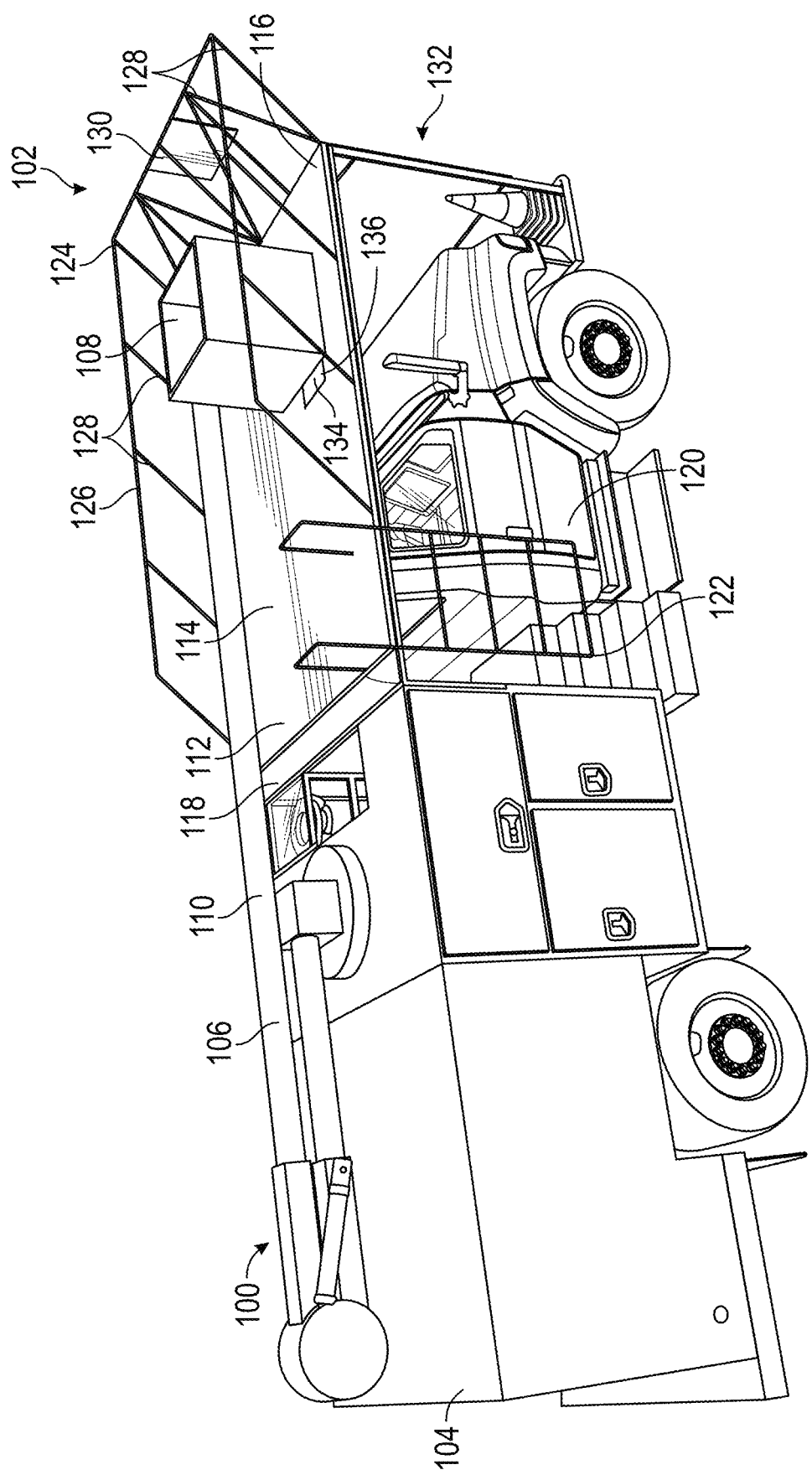
FIG. 2 depicts another view of the vehicle and cab guard assembly of FIG. 1.

FIGS. 1 and 2 illustrate an example of an aerial device 100 with a cab guard assembly 102. In these examples, both the aerial device 100 and the cab guard assembly 102 are mounted on a vehicle 104. However, the disclosure of the specific vehicle 104 should not be considered limiting on the current disclosure. In various examples, the aerial device 100 may be a mid-mount aerial device, a rear-mounted aerial device, etc.

The aerial device 100 may be a manned aerial device (meaning that it is configured to accommodate a worker during use) or an unmanned aerial device (meaning that a worker is not necessarily on the aerial device during use). As illustrated in FIG. 1, the aerial device 100 includes a lift mechanism 106 and a work device 108. In certain examples where the aerial device 100 is manned, the work device 108 may be a work platform, bucket, or other suitable device that accommodates the worker. In other examples where the aerial device 100 is unmanned, the work device may be various equipment or other devices such as saws, hoses, tools, other equipment, etc. depending on the intended environment and use of the aerial device. In the example of FIGS. 1 and 2, the work device 108 is a work platform that accommodates a worker.

The lift mechanism 106 is configured to vertically position the work device 108 as desired such that a worker 500 (see FIG. 5), workers 500 or equipment on the work device 108 can access otherwise inaccessible areas, usually at a height. In various examples, the lift mechanism 106 is configured to move the work device 108 between a stowed position (shown in FIG. 1) and a deployed position. Generally, the aerial device 100 in the stowed position corresponds to a situation where it is likely that the worker 500 will access the cab guard assembly 102 on the vehicle 104 for access, inspection, and maintenance of the aerial device 100 (e.g., because components of the aerial device 100 are more accessible). Conversely, the aerial device 100 in the deployed position corresponds to a situation where it is less likely (or even prohibited) for the worker 500 to access the cab guard assembly 102 on the vehicle 104 (e.g., because the aerial device 100 is being used). As one example, in some cases, in the stowed position, the work device 108 is positioned proximate to and/or on a base platform 112 of the cab guard assembly 102, and in the deployed position, the work device 108 is vertically offset from the base platform 112. In some examples, the lift mechanism 106 includes a boom 110 having one or more sections that cooperate to vertically position the work device 108. It will be appreciated that the boom 110 and/or other components of the aerial device 100 have particular positions corresponding to the stowed and deployed positions. For example, in the stowed position, upper and lower segments of the boom 110 may be adjacent to one another, and in the deployed position, the upper and lower segments of the boom 110 may be spaced apart (e.g., because the boom is extended). In other examples, various other suitable lift mechanisms 106 including, but not limited to, scissor-lifting mechanisms, hotel lift mechanisms, or various other suitable mechanisms. The work device 108 may be a bucket, platform, machinery or equipment (e.g., trimming device, crane, etc.) or various other suitable devices for supporting the worker(s) 500 and/or equipment.

Figure 3:
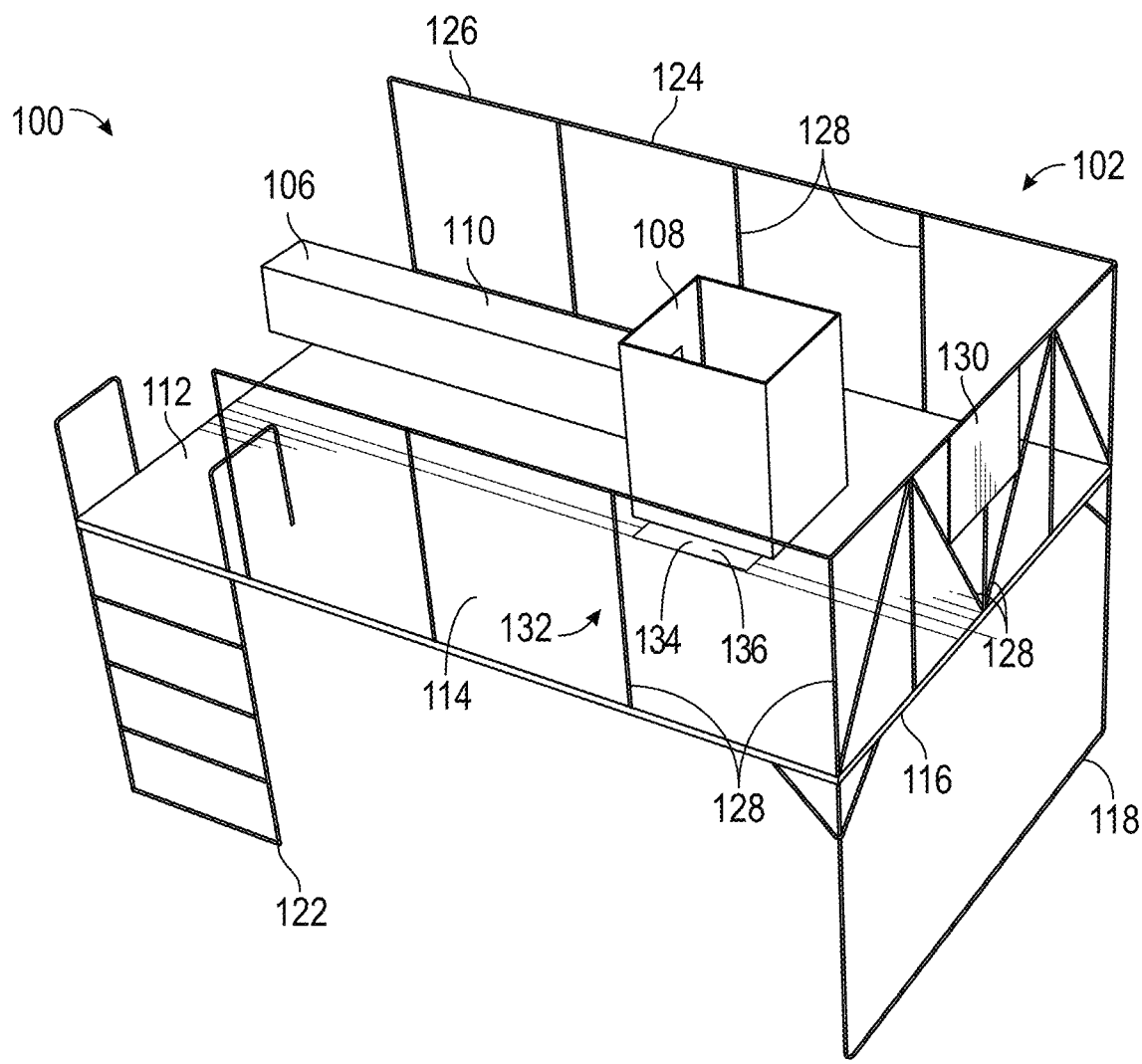
FIG. 3 depicts another view of the cab guard assembly of FIG. 1.

The cab guard assembly 102 includes the base platform 112. As illustrated in FIGS. 1-3, the base platform 112 includes a support surface 114 having a perimeter edge 116. In the present example, the support surface 114 is a rectangular shape, although in various other examples, the support surface 114 may be any shape as desired. In various examples, the lift mechanism 106 is configured to position the work device 108 on or proximate to the support surface 114 in the stowed position such that the work device 108 is accessible from the base platform 112 (e.g., such that a workman can enter or exit the work device 108, inspect the work device 108, perform maintenance or repair on the work device 108, etc.).

In some examples, the cab guard assembly 102 includes a mounting frame 118 that supports the base platform 112. In various examples, the mounting frame 118 is secured to the vehicle 104. In some aspects, the mounting frame 118 supports the base platform 112 above a cab 120 of the vehicle 104 such that the cab guard assembly 102 is a cab guard for the vehicle 104. In certain optional examples, the cab guard assembly 102 includes a platform access device 122. The platform access device 122 may be a ladder or other suitable device for providing access to the base platform 112 for entry and exit to the work device 108, inspection of the work device 108, maintenance on the work device 108, etc.

Referring to FIGS. 1-3, a cab guard safety system 132 includes a coupler 134 and an adjustable railing 124. As described in detail below, the coupler 134 selectively positions the adjustable railing 124 between at least a stowed position and a deployed position based on a position of a component of the aerial device 100 (e.g., a position of the lift mechanism 106, a position of the work device 108, etc.).

The coupler 134 may be positioned at various locations on the cab guard assembly 102 and/or the aerial device 100. In the example of FIGS. 1-3, the coupler 134 is positioned on the base platform 112. However, in other examples, the coupler 134 may be positioned on a cradle for the boom 110 (see, e.g., FIG. 11), on the boom 100 itself (e.g., on an upper portion of the boom, a lower portion of the boom, or both), or various other suitable locations as desired.

The coupler 134 may be various devices suitable for determining or detecting a presence or position of a component of the aerial device 100 (e.g., a predetermined distance relative to the coupler 134, base platform 112, etc.). For example, in some cases, the coupler 134 may be a spring-tensioned lever that is positioned at various positions based on contact between the component of the aerial device 100 (e.g., the work device 108 or other component) and the coupler 134. In certain examples, the coupler 134 may be a magnetic hinge, a hydraulic hinge, a pneumatic hinge, or an electric hinge. In other examples, the coupler 134 may be a force sensor that detects the position of the component of the aerial device 100 based on a force or change in force that the component of the aerial device applies onto the force sensor. As a further example, the coupler 134 may be a pressure sensor that detects the position of the component of the aerial device 100 based on a pressure or change in pressure that the aerial device applies onto the pressure sensor. In another example, the coupler 134 may be a proximity sensor that detects the position of the component of the aerial device 100 based on a proximity or change in proximity to a predetermined location. As an additional example, the coupler 134 may be a light sensor that detects the position of the component of the aerial device 100 based on a detected light or change in light. It will be appreciated that the above examples are provided for reference purposes only and should not be considered limiting on the current disclosure, as the coupler 134 may be various other suitable devices for determining or detecting the position of the component of the aerial device 100.

In the example of FIGS. 1-5, the coupler 134 is a proximity sensor 136. As described in detail below, when the proximity sensor 136 does not detect a presence and/or that the component of the aerial device 100 is more than a predetermined distance from the coupler 134 (because the component of the aerial device 100 is spaced apart from the coupler 134), the coupler 134 causes the adjustable railing 124 to move to the stowed position. Conversely, when the proximity sensor 136 detects a presence and/or that the component of the aerial device 100 is less than a predetermined distance from the coupler 134 (e.g., because the component of the aerial device 100 is contacting the proximity sensor 136), the coupler 134 causes the adjustable railing 124 to move to the deployed position.

The coupler 134 is communicatively coupled to the adjustable railing 124 such that the coupler 134 can position the adjustable railing 124 based on the detected position of the component of the aerial device 100. In some examples, the coupler 134 may be mechanically connected to the adjustable railing 124, may be in wired communication with the adjustable railing 124, may be in wireless communication with the adjustable railing 124, may be in fluid communication with the adjustable railing 134 (e.g., pneumatic, hydraulic, etc.), or may be communicatively coupled through various other suitable mechanisms.

As illustrated in FIGS. 1-3, in various examples, the adjustable railing 124 extends around at least a portion of the perimeter edge 116 of the base platform 112. In some examples, the adjustable railing 124 extends around the perimeter edge 116 such that the adjustable railing 124 does not interfere with the positioning of the work device 108 in the stowed position. In other examples, the adjustable railing 124 is configured to fit or be positioned around other existing structures of the aerial device 100 or vehicle 104.

The adjustable railing 124 includes at least one top rail 126 and a plurality of side rails 128 supporting the top rail 126. Optionally, a midrail may be provided between the top rail 126 and the base platform 112. As described in detail below, the side rails 128 may be connected to the top rail 126 and/or the base platform 112 such that a height of the adjustable railing 124 is adjustable. In some examples, a continuous top rail 126 is provided; however, in other examples, a plurality of top rails 126 may be provided, and each of the plurality of top rails 126 may extend along a portion of the perimeter edge 116.

The side rails 128 are movable relative to the base platform 112 such that a height of the adjustable railing, or a distance from the base platform 112 to the top rail 126, is movable between a stowed position and a deployed position. In various aspects, the height of the adjustable railing in the deployed position is greater than the height of the railing in the stowed position. In certain aspects, the height of the adjustable railing in the deployed position is from about 39 inches to about 45 inches, although it need not be. For example, in other cases, the height of the adjustable railing in the deployed position may be less than about 39 inches or may be greater than about 45 inches. In some aspects, the adjustable railing 124 is further movable to a transport position where the height of the adjustable railing 124 is greater than the height in the stowed position but less than the height in the deployed position. In some examples, the adjustable railing 124 is movable to the transport position during transport of the vehicle 104 and/or aerial device 100 to reduce a travel height of the vehicle 104 and/or aerial device 100.

Figure 4:
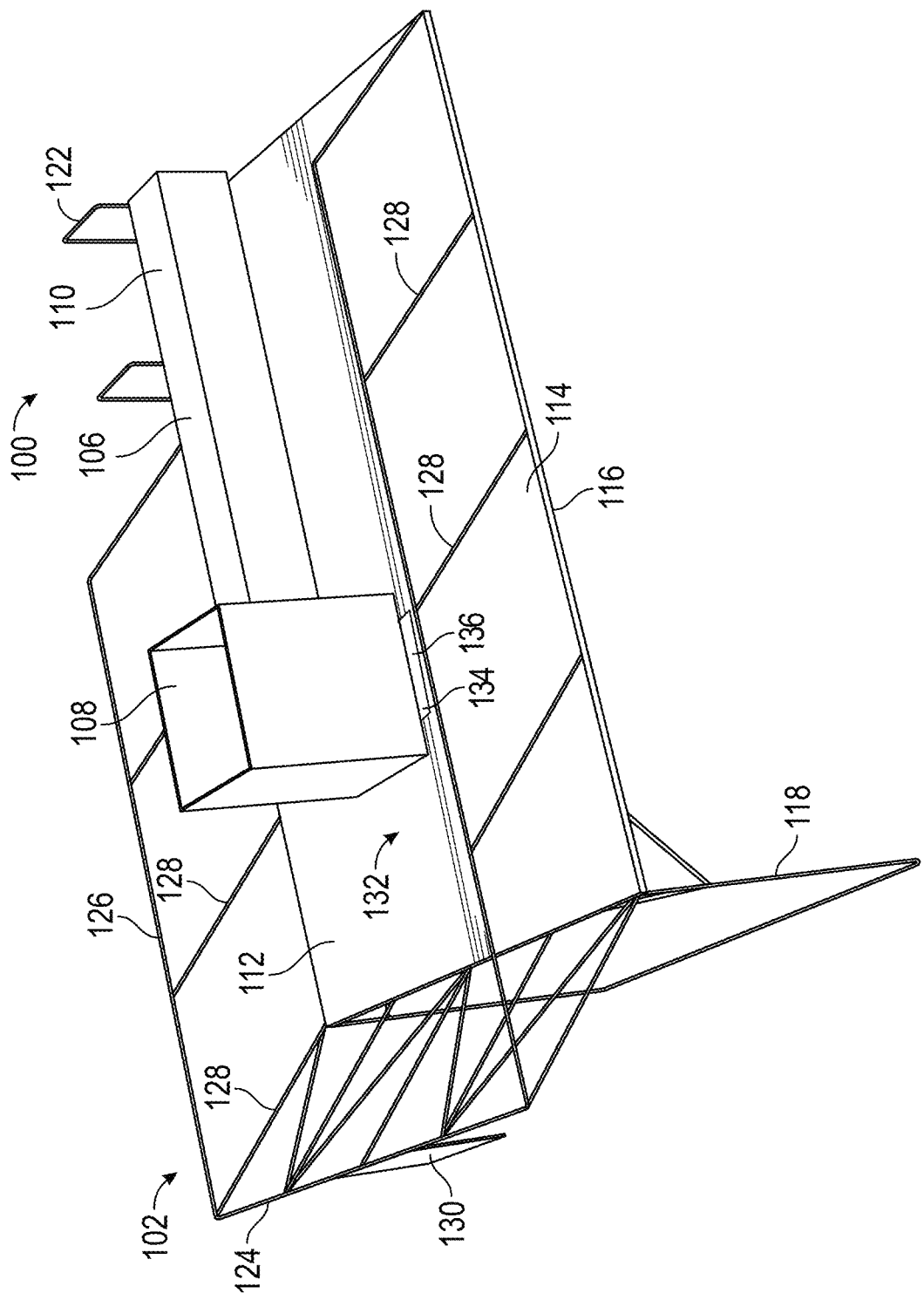
FIG. 4 depicts another view of the cab guard assembly of FIG. 1 with an adjustable railing in a stowed position.
Figure 5:
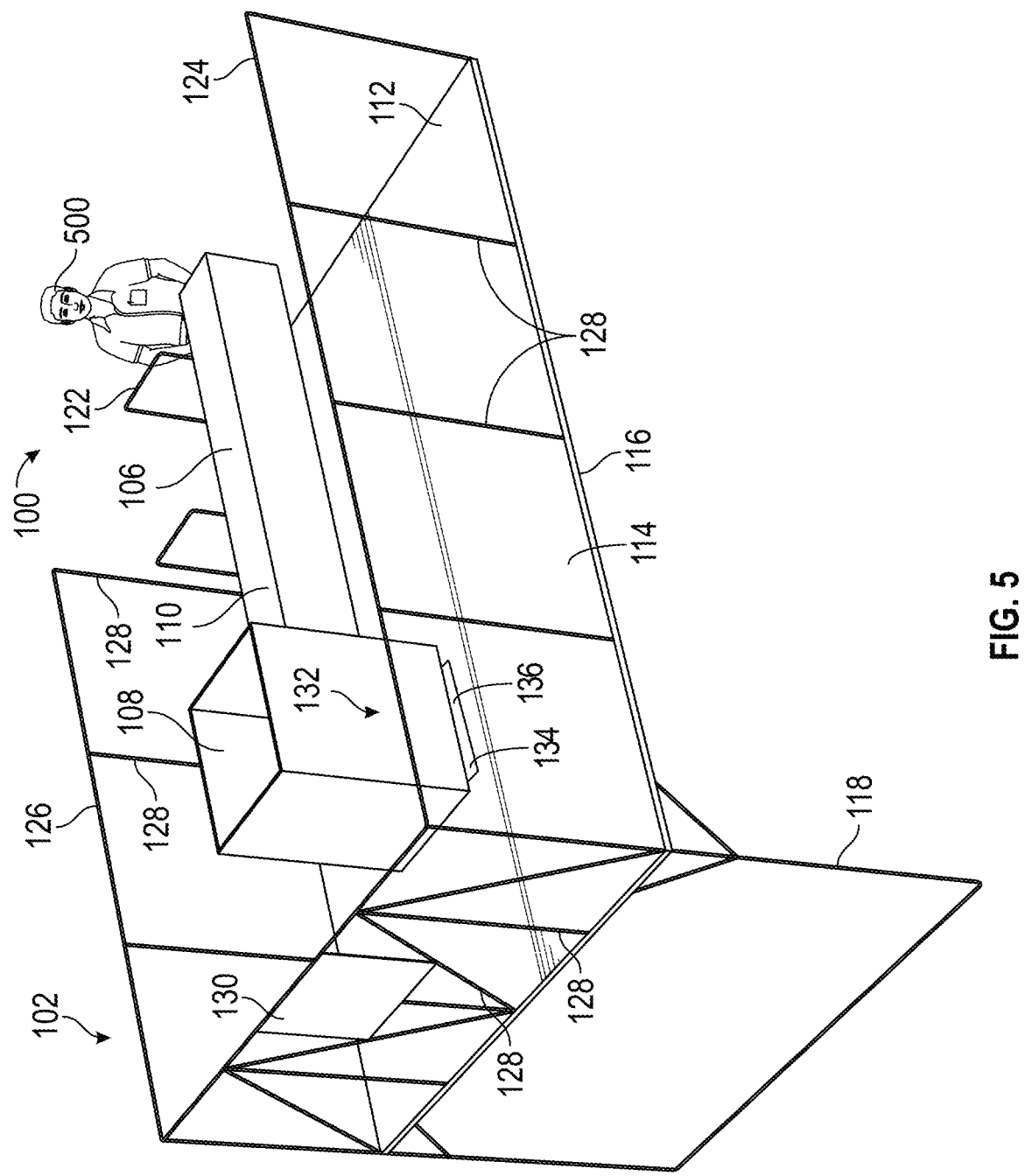
FIG. 5 depicts another view of the cab guard assembly of FIG. 1 with the adjustable railing in a deployed position.

Referring to FIGS. 4 and 5, the side rails 128 may include various suitable adjustment mechanisms such that the height of the adjustable railing 124 can be controlled. As one example, in some cases, the side rails 128 are pivotally connected to the base platform 112 and/or the mounting frame 118 as well as the top rail 126 such that the side rails can pivot in a forward and reverse direction to adjust the height of the adjustable railing 124. For example, in some cases, the side rails 128 pivot in the forward direction to position the adjustable railing 124 in the stowed position and pivot in the reverse direction to position the adjustable railing 124 in the deployed position. In various aspects, the side rails 128 are pivotable in the forward and reverse direction such that the side rails 128 move in a direction that is substantially parallel to a plane defined by a side portion of the perimeter edge 116. In other examples, the side rails 128 may be pivotable in other directions. In certain optional examples, a spacing between adjacent side rails 128 may be maintained when the adjustable railing 124 is in both the stowed position and the deployed position, although it need not be in other examples. As another example, adjacent the side rails 128 may be linked in a crisscross pattern and vertically position the top rail 126 through a scissor mechanism. In other examples, the side rails 128 may be slidably connected to the base platform 112 and/or the mounting frame 118 such that the side rails 128 are vertically slidable. In other cases, the side rails 128 may be telescoping rails. In additional examples, the side rails 128 may be pivotally connected to the base platform 112 and/or the mounting frame 118 such that they pivot outwards or away from the base platform 112. In such examples, the side rails 128 may pivot in a direction that is substantially perpendicular to the plane defined by the side portion of the perimeter edge 116, although it need not be in other examples. In some examples, the side rails 128 may pivot (in any direction) to various angles, such as from about 0° (in the deployed position) to about 180° (in the stowed position), such as from about 0° to about 90°. In other examples, the side rails may pivot to angles greater than 180°. In various examples, the side rails 128 may be connected to the base platform 112 and/or the mounting frame 118 through hinges and lifts that may be hydraulically actuated, pneumatically actuated, electrically motorized, magnetically actuated, or may utilize various other suitable mechanisms. It will be appreciated that the above examples are provided for reference purposes only and should not be considered limiting on the current disclosure, as the adjustable railing 124 may include various other suitable adjustment mechanisms for controlling and/or adjusting a height of the adjustable railing 124.

In various examples, the coupler 134 is connected to the adjustable railing 124 such that movement or positioning of the component of the aerial device 100 (e.g., vertical positioning of the work device 108) may move the adjustable railing 124 between the stowed position and the deployed position. In some examples, coupler 134 is coupled to the adjustable railing 124 such that the adjustable railing 124 is in the deployed position when the component of the aerial device 100 is in the stowed position and the adjustable railing 124 is in the stowed position when the component of the aerial device 100 is in the deployed position.

According to some optional examples, a railing control system may be provided with the cab guard assembly 102. In some examples, the railing control system includes a controller that is communicatively coupled with the adjustable railing 124 and/or the coupler 134. In other examples, the controller may be omitted, and the coupler 134 is in direct communication with the adjustable railing 124. When included, the controller receives position or presence data from the coupler 134 and analyzes the data to determine the position or presence of the component of the aerial device 100. In some examples, analyzing the data includes comparing the received data to a predefined or threshold distance, pressure, force, light, etc. that corresponds to the component of the aerial device 100 being stowed, deployed, and/or in transport. Based on the determination that the component of the aerial device 100 is stowed or deployed, the controller causes the adjustable railing 124 to move from the stowed position to the deployed position or vice versa. In various aspects, the controller causes the adjustable railing 124 to move by activating hinges, lifts, pneumatic actuators, hydraulic actuators, electric motors, magnets or magnetic actuators, or various other suitable mechanisms.

In some cases, the controller may cause the adjustable railing 124 to be partially lowered from the deployed position to the transport position (or to partially raise the adjustable railing 124 from the stowed position to the transport position) during transport of the cab guard assembly 102. Optionally, the controller may determine that the component of the aerial device 100 is being transported (to position the adjustable railing 124 in the transport position) based on an indication from a worker (e.g., activation of a button or switch), an activation of the engine of the vehicle, a speed detection, etc.

In some cases, the railing control system includes an alarm that is selectively controlled by the controller to provide an alert to the worker(s) 500 of the aerial device when the adjustable railing 124 is in the stowed position and/or in the deployed position. The alarm may be various suitable devices for generating an alert such as a visual alert, auditory alert, or various other types of alerts. The alarm may be various suitable devices, including, but not limited to, a speaker, a light, a screen or monitor, a physical object or device, a flag, a sign, etc. In certain cases, the controller may cause the alarm to provide alerts when the adjustable railing 124 is in the stowed position but the lift mechanism 106 is improperly stowed. In such cases, the position of the lift mechanism may be detected through various suitable sensors, buttons, monitors, or other suitable devices at various locations as desired using the coupler 134 and/or other devices. As one example, the controller may cause the alarm to issue an alert, such as a visual alert, auditory alert, or various other types of alerts, when the adjustable railing 124 is in the deployed position. Such an alert may help ensure that the adjustable railing 124 is fully deployed before the worker 500 accesses the base platform 112 (e.g., for entry to or exit from the work device 108, maintenance or repair of the work device 108, inspection of the work device 108, etc.) before transport of the cab guard assembly 102, etc. In some cases, the controller causes the alarm to produce the alerts when the adjustable railing 124 is in the stowed position and/or in the deployed position. In some cases, the controller causes the alarm (or a first alarm) to produce a first type of alert (e.g., sound, pitch, color of light, frequency, etc.) for the stowed position and causes the alarm (or a second alarm) to produce a second type of alert for the deployed position. Optionally, the controller causes the alarm (or a third alarm) to produce a third type of alert when the adjustable railing 124 is in the stowed position but the lift mechanism 106 is improperly stowed.

In the example of FIGS. 1-5, the alarm is a visual alarm 130 such as a flag, sign, or other physical device attached to the adjustable railing 124 and configured to move with the adjustable railing 124 to provide a visual alert. In various examples, the position of the visual alarm 130 on the adjustable railing 124 provides an indication of when the adjustable railing 124 is in the stowed position (see FIG. 4) or deployed position (see FIG. 5). In certain aspects, because the adjustable railing 124 is coupled to the lift mechanism 106, the visual alarm 130 also provides an indication of when the lift mechanism 106 is properly stowed or improperly stowed (e.g., for transport). In other examples, the alert is an electronic alert, such as a light or audible sound, provided inside the cab 120, exterior to the cab 120, on the base platform 112, or at various other locations as desired.

Figure 6:
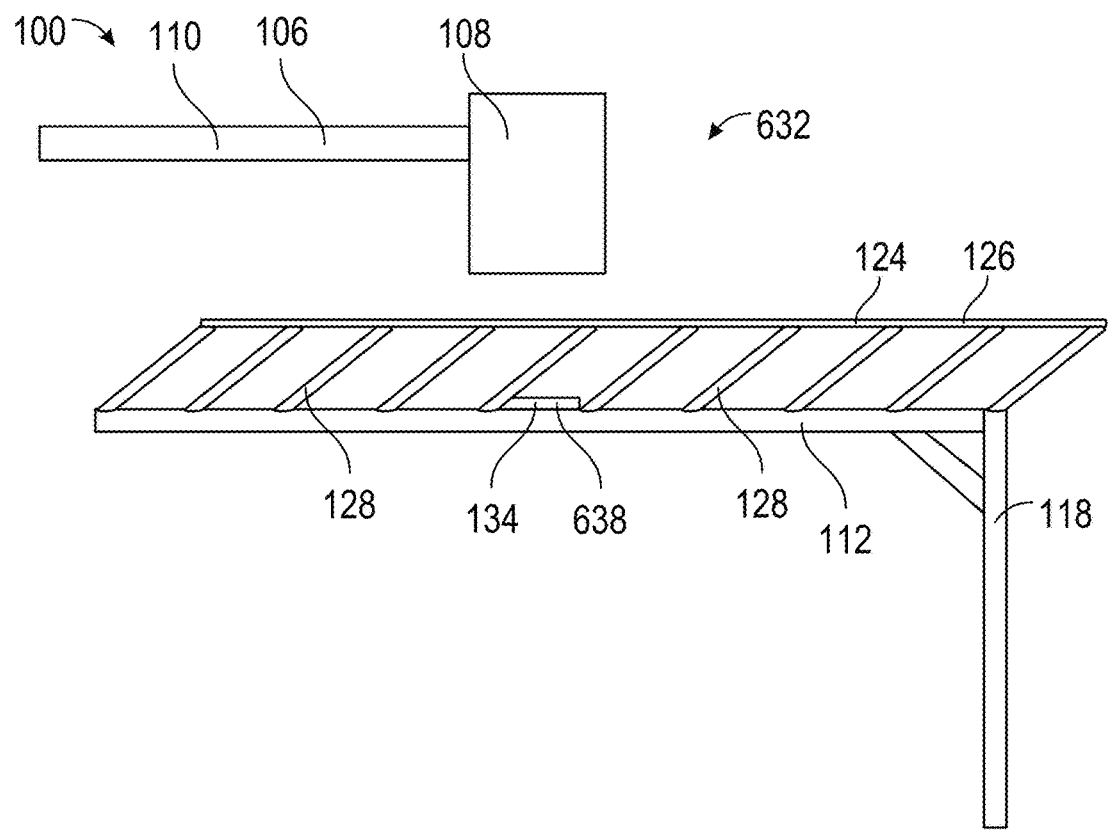
FIG. 6 depicts an example of a cab guard assembly according to aspects of the present disclosure with an adjustable railing in a stowed position.
Figure 7:
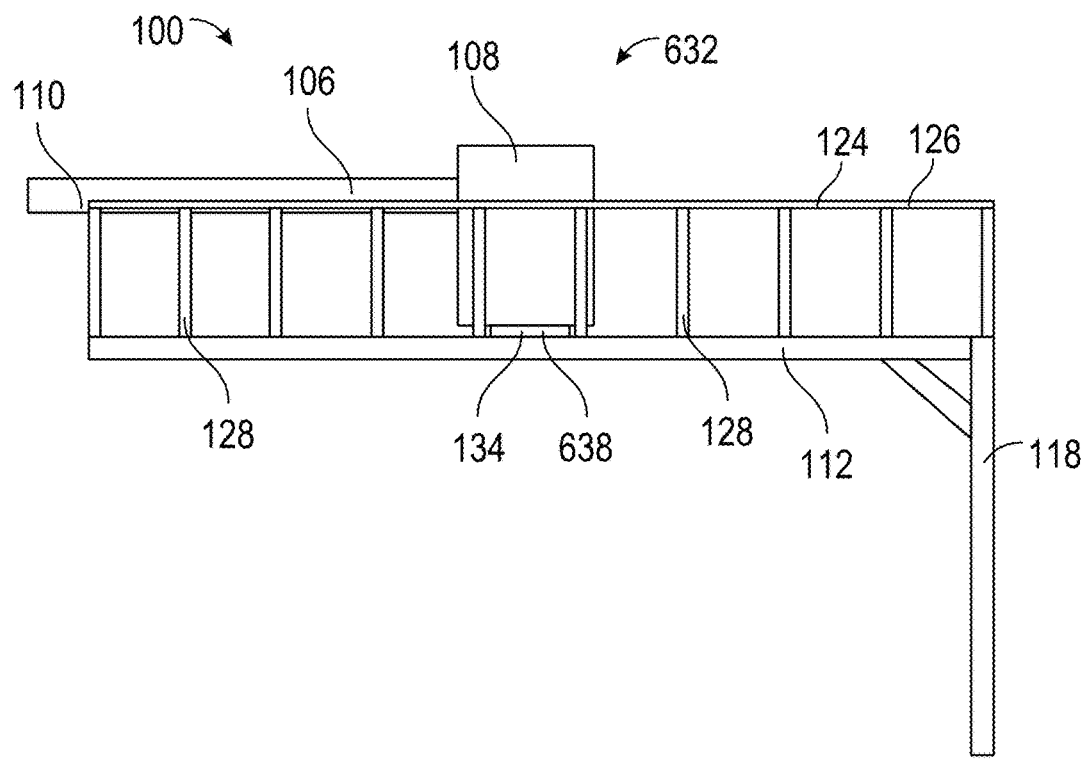
FIG. 7 depicts another view of the cab guard assembly of FIG. 6 with the adjustable railing in a deployed position.

FIGS. 6 and 7 illustrate another example of a cab guard safety system 632 with the aerial device 100 and the cab guard assembly 102. The cab guard safety system 632 is substantially similar to the cab guard safety system 132 except that the coupler 134 of the cab guard safety system 632 is a pressure sensor or pad 638. As illustrated in FIG. 6, when the coupler 134 does not detect a pressure and/or that a pressure applied being applied to the pressure sensor 638 is below a predetermined threshold (e.g., because the component of the aerial device 100 is spaced apart from the coupler 134), the coupler 134 causes the adjustable railing 124 to move to the stowed position. Conversely, as illustrated in FIG. 7, when the coupler 134 detects a pressure and/or a pressure at or above a predetermined threshold (e.g., because the component of the aerial device 100 is contacting the pressure sensor 638), the coupler 134 causes the adjustable railing 124 to move to the deployed position.

Figure 8:
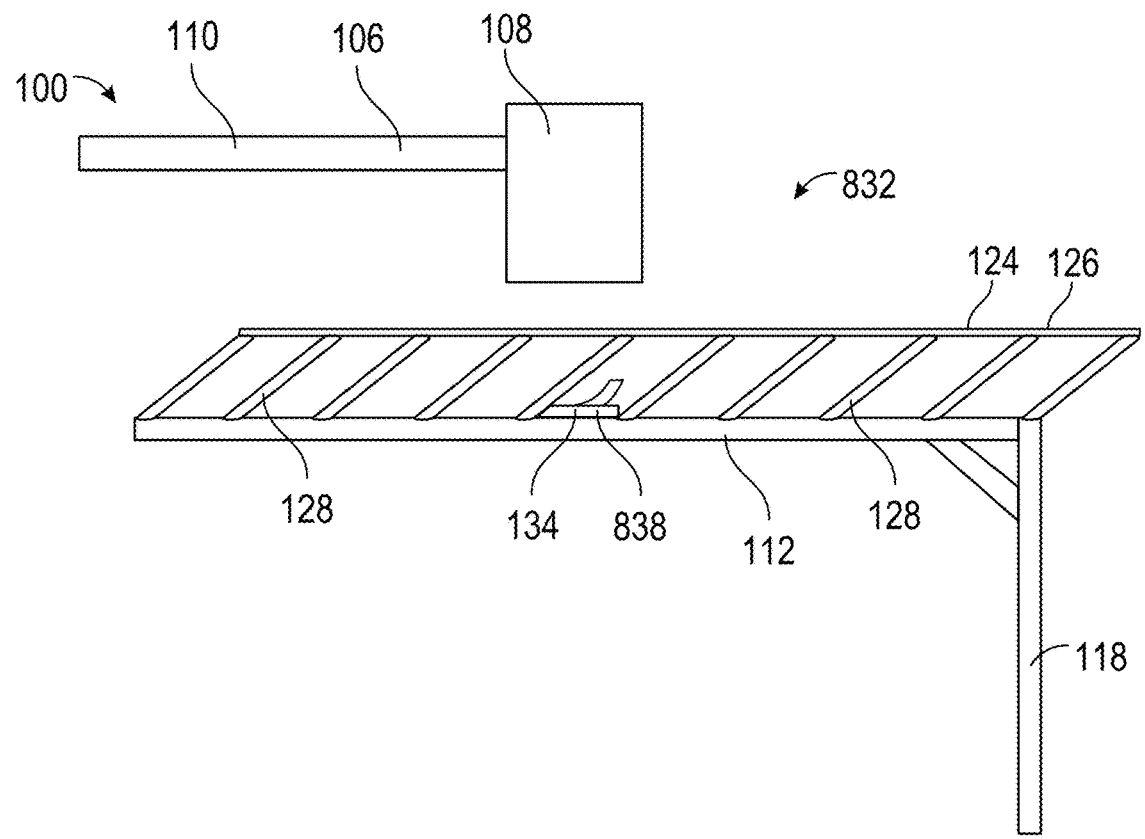
FIG. 8 depicts an example of a cab guard assembly according to aspects of the present disclosure with an adjustable railing in a stowed position.
Figure 9:
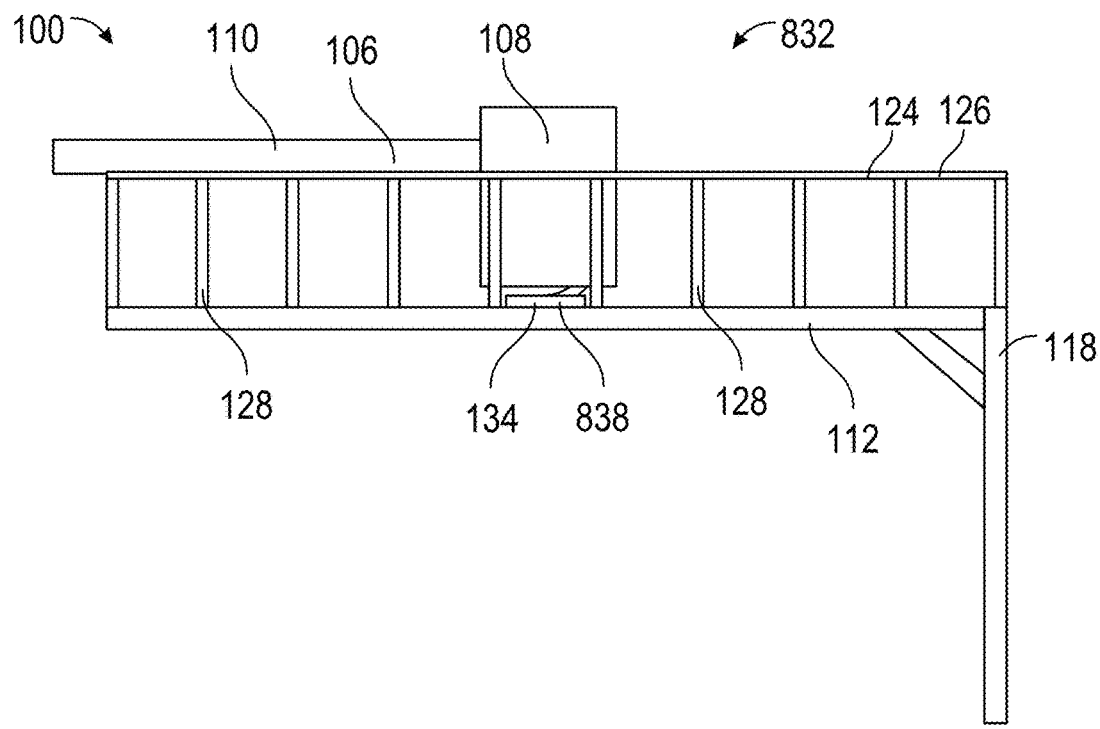
FIG. 9 depicts another view of the cab guard assembly of FIG. 8 with the adjustable railing in a deployed position.

FIGS. 8 and 9 illustrate another example of a cab guard safety system 832 with the aerial device 100 and the cab guard assembly 102. The cab guard safety system 832 is substantially similar to the cab guard safety system 132 except that the coupler 134 of the cab guard safety system 832 is a lever 838. In some aspects, the lever 838 is a spring-tensioned lever that biases the adjustable railing 124 to the stowed position. In other aspects, various other suitable types of levers may be utilized. As illustrated in FIG. 8, when the component of the aerial device 100 is not engaged with the lever 838, the lever 838 biases the adjustable railing 124 to the stowed position. As illustrated in FIG. 9, when the component of the aerial device 100 engages the lever 838 (e.g., the component moves the lever 838 from a first position to a second position), the lever 838 moves the adjustable railing 124 to the deployed position.

Figure 11:
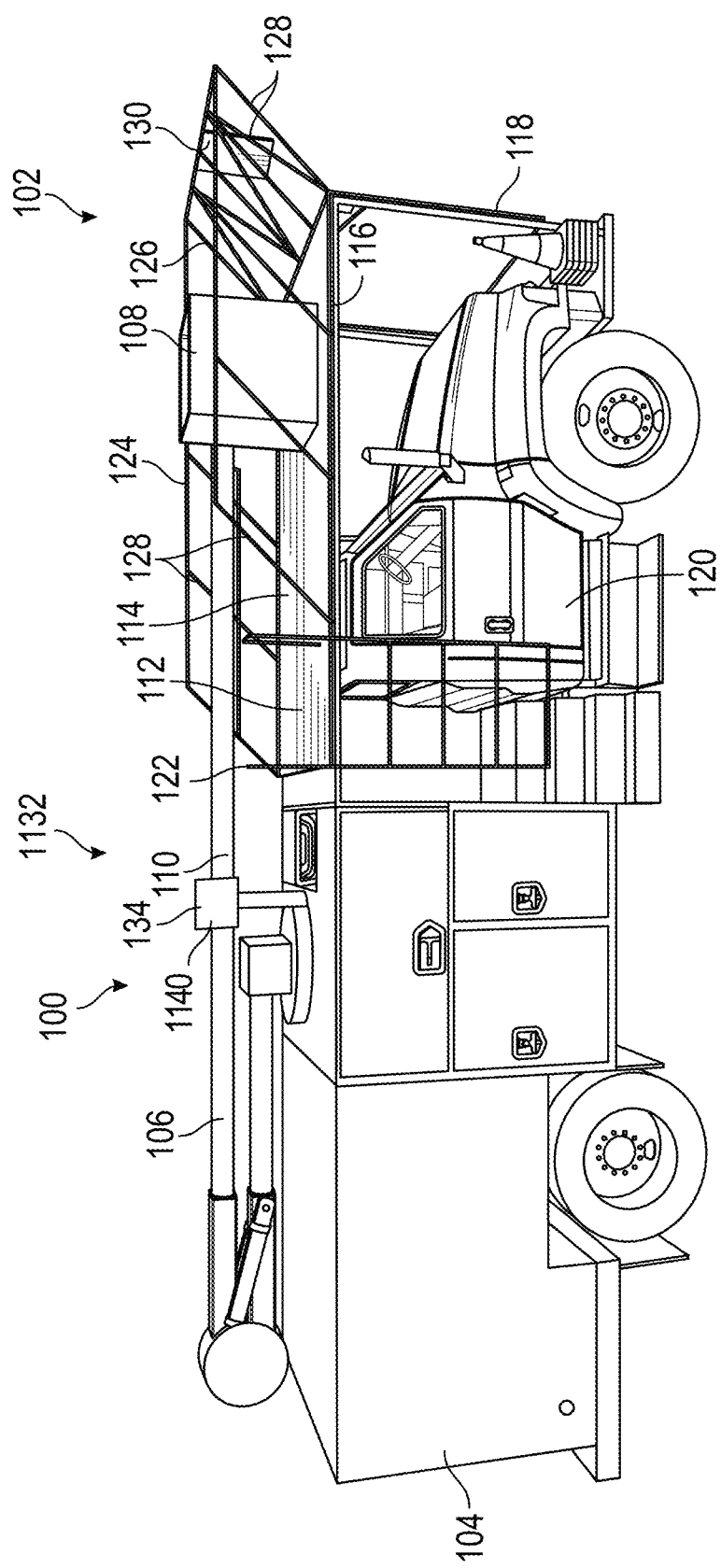
FIG. 11 depicts an example of a vehicle with a cab guard assembly for an aerial device according to aspects of the present disclosure.

FIG. 11 illustrates another example of a cab guard safety system 1132 with the aerial device 100 and the cab guard assembly 102. The cab guard safety system 1132 is substantially similar to the cab guard safety system 132 except that the coupler 132 of the cab guard safety system 1132 is a cradle 1140 configured to support the boom 110 in the stowed position. In certain aspects, the cradle 1140 may be provided with the aerial device 100 and/or the cab guard assembly 102, and various sensors or other detection devices as discussed previously may be provided at on the cradle 1140. In other words, the cradle 1140 may be retrofit with another component to become the coupler 134, a separate coupler 134 may be positioned on the cradle 1140, and/or the cradle 1140 may be natively formed as the coupler 134. In certain aspects, the cradle 1140 provides further stability and positioning to the boom 110 when stowed.

Figure 10:
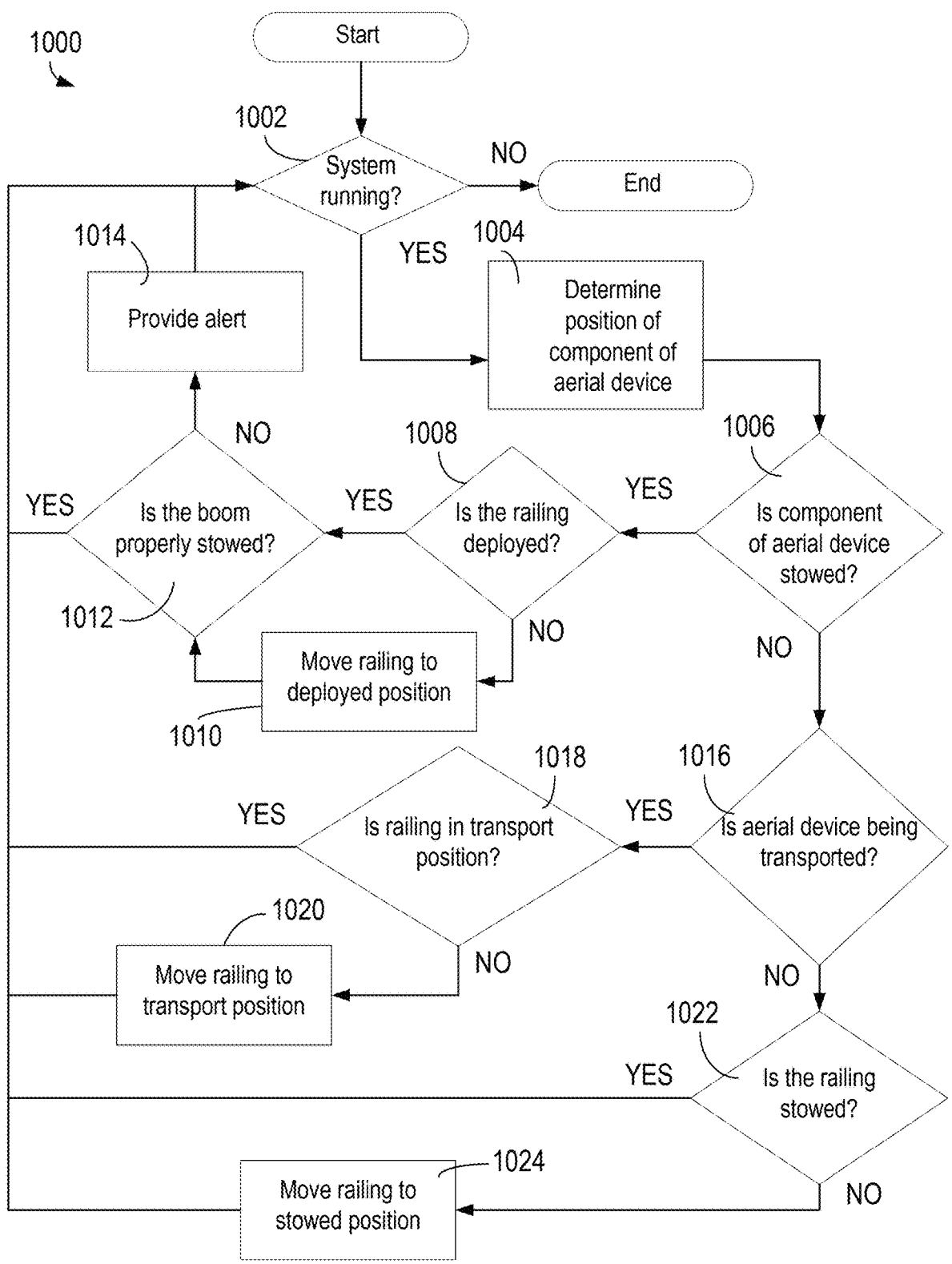
FIG. 10 depicts an example of a method of controlling a cab guard assembly according to aspects of the present disclosure.

FIG. 10 depicts an example of a method 1000 of controlling the adjustable railing of the cab guard safety system. Method 1000 is described with respect to one or more examples provided herein. But other implementations are possible.

In a block 1002, the method includes determining whether the system is running Determining whether the system is running may include determining an initial activation of the aerial device, vehicle, etc. that indicates that the overall system is being manned or utilized by workers.

In a block 1004, the method includes determining a position or presence of a component of an aerial device with the coupler. In some examples, determining the position or presence of the component of the aerial device includes determining the position or presence by detecting a proximity of the component of the aerial device, a force applied by the component of the aerial device, a pressure applied by the component of the aerial device, a contact or engagement with the coupler by the component of the aerial device, a light detected, or various other suitable mechanisms.

In a block 1006, the method determines whether the component of the aerial device is stowed.

If the component of the aerial device is stowed, in a block 1008, the method determines whether the adjustable railing is in the deployed position.

If the adjustable railing is not in the deployed position, in a block 1010, the method includes moving the adjustable railing to the deployed position. In some aspects, moving the adjustable railing may include sending a control signal to the adjustable railing, activating an electric motor, hydraulically actuating the railing, pneumatically actuating the railing, magnetically actuating the railing, moving the railing through hinges or lifts, etc. The method then proceeds to block 1012.

If the adjustable railing is in the deployed position, in the block 1012, the method includes determining whether the boom is properly stowed. Determining whether the boom is properly stowed may include determining a position of the boom with a button, a sensor, the coupler, a visual detection, etc. If the boom is properly stowed, the method proceeds to block 1002.

If the boom is not properly stowed, in a block 1014, the method includes providing an alert. Providing the alert may include sending an alert signal to an alarm and causing the alarm to provide a visual alert, an auditory alert, etc. The method then proceeds to block 1002.

If the method determines that the component of the aerial device is not stowed in block 1006, in a block 1016, the method includes determining whether the aerial device is being transported. In some examples, determining whether the aerial device is being transported includes determining an activation of an engine of the vehicle on which the aerial device is supported, detecting a speed of the aerial device and/or vehicle, etc. If the method determines that the aerial device is being transported in block 1016, in a block 1018, the method includes determining whether the railing is in a transport position. If the railing is in the transport position, the method proceeds to block 1002. If the railing is not in the transport position, in a block 1020, the method includes moving the railing to the transport position. In some aspects, blocks 1016, 1018, and/or 1020 are omitted If the method determines that the aerial device is not being transported in block 1016 and/or if the method determines that the aerial device is not stowed in block 1006, in a block 1022, the method includes determining whether the railing is stowed. Determining whether the railing is stowed may include determining a position of the railing, a position or status of an activation mechanism of the railing, etc. If the railing is stowed, the method proceeds to block 1002.

If the railing is not stowed, in a block 1024, the method includes moving the railing to the stowed position. In some aspects, moving the adjustable railing may include sending a control signal to the adjustable railing, activating an electric motor, hydraulically actuating the railing, pneumatically actuating the railing, magnetically actuating the railing, moving the railing through hinges or lifts, etc. The method then proceeds to block 1002.

By coupling the position or presence of the component of the aerial device 100 with the height of the adjustable railing 124 through the coupler 134, the cab guard safety system 132 provides an enhanced safety environment for the cab guard assembly, aerial device, and vehicle. In one aspect, the cab guard safety system 132 automatically deploys the adjustable railing 124 to its deployed height (e.g., maximum height) when the aerial device 100 is in a position where it is likely a worker will access the cab guard assembly 102 for access, inspection, and maintenance of the aerial device 100. Such deployment automatically reduces or minimizes the risk of the worker falling off of the cab guard assembly 102. The deployment further provides visual indication of when it is safe to access cab guard. Furthermore, the cab guard safety system 132 automatically stows the adjustable railing 124 to its stowed height or transport height when the aerial device 100 is in a position where it is less likely a worker will access the cab guard assembly 102 for access, inspection, and maintenance of the aerial device 100 (e.g., because the aerial device is in use or being transported). Such stowing minimizes or reduces interference with the aerial device 100 while the aerial device, and further optionally reduces or minimizes the possibility of the adjustable railing 124 being in an unsuitable position during transport (which may otherwise occur if relying on actions of the workers).

Moreover, by coupling the position or presence of the component of the aerial device 100 with the height of the adjustable railing 124 through the coupler 134, the cab guard safety system 132 does not necessarily require any additional action by the worker to provide the enhanced safety environment. For example, in many working environments, workers must perform a plurality of tasks. Depending on the number of tasks, workers may forget to perform certain actions, may be less motivated to perform all actions and take short-cuts instead, etc. In some aspects, because the cab guard safety system 132 does not necessarily require additional action by workers, the cab guard safety system 132 provides an enhanced safety environment that promotes increased safety compliance. In various cases, the cab guard safety system 132 may also provide an enhanced safety environment that is tamper proof and/or cannot be overridden by a worker without significant changes to the system 132.

A collection of exemplary examples, including at least some explicitly enumerated as "ECs" (Example Combinations), providing additional description of a variety of example types in accordance with the concepts described herein are provided below. These examples are not meant to be mutually exclusive, exhaustive, or restrictive; and the invention is not limited to these example examples but rather encompasses all possible modifications and variations within the scope of the issued claims and their equivalents.

EC 1. An aerial device system comprising: a base platform comprising a support surface and a perimeter edge and configured to provide access to a work platform of a lift system; and an adjustable railing extending along at least a portion of the perimeter edge of the base platform and comprising a top rail, wherein the adjustable railing is movable between a deployed position and a stowed position, wherein the top rail of the adjustable railing is a first distance from the support surface in the deployed position and a second distance from the support surface in the stowed position, and wherein the first distance is greater than the second distance.

EC 2. The aerial device system of any of the preceding or subsequent example combinations, wherein the adjustable railing is configured to couple with the lift system that is configured to vertically position the work platform such that vertically positioning the work platform with the lift system moves the adjustable railing between the deployed position and the stowed position.

EC 3. The aerial device system of any of the preceding or subsequent example combinations, the adjustable railing is configured to couple with the lift system such that the adjustable railing is in the deployed position when the lift system vertically positions the work platform in a stowed position and the adjustable railing is in the stowed position when the lift system vertically positions the work platform in a deployed position.

EC 4. The aerial device system of any of the preceding or subsequent example combinations, wherein the adjustable railing is configured to couple with the lift system through at least of a spring tensioned lever, a hydraulic hinge, a pneumatic hinge, or an electric hinge.

EC 5. The aerial device system of any of the preceding or subsequent example combinations, wherein the adjustable railing comprises a plurality of side rails supporting the top rail, and wherein the plurality of side rails are movable relative to the base platform to move the adjustable railing between the deployed position and the stowed position.

EC 6. The aerial device system of any of the preceding or subsequent example combinations, wherein the plurality of side rails are pivotally connected to the base platform, and wherein the plurality of side rails are configured to pivot in a direction that is substantially parallel to a plane defined by the perimeter edge of the base platform or in a direction that is substantially perpendicular to the plane defined by the perimeter edge.

EC 7. The aerial device system of any of the preceding or subsequent example combinations, wherein the plurality of side rails are vertically movable in a direction substantially perpendicular to the support surface.

EC 8. The aerial device system of any of the preceding or subsequent example combinations, wherein the plurality of side rails are telescoping side rails.

EC 9. The aerial device system of any of the preceding or subsequent example combinations, wherein the plurality of side rails form a scissor lift.

EC 10. The aerial device system of any of the preceding or subsequent example combinations, the adjustable railing is configured to couple with the lift system such that the adjustable railing is movable to a transport position, wherein the top rail of the adjustable railing is a third distance from the support surface in the transport position, and wherein the third distance is less than the first distance and greater than the second distance.

EC 11. The aerial device system of any of the preceding or subsequent example combinations, further comprising an alarm system configured to provide an alert when the adjustable railing is in the stowed position.

EC 12. The aerial device system of any of the preceding or subsequent example combinations, wherein the alert comprises at least one of a visual alert or an auditory alert.

EC 13. The aerial device system of any of the preceding or subsequent example combinations, wherein the base platform further comprises a mounting frame configured to connect the base platform to a vehicle.

EC 14. A cab guard system comprising: a base platform comprising a support surface; and an adjustable railing connected to the base platform, wherein the adjustable railing is movable between a stowed position and a deployed position, wherein a height of the adjustable railing in the deployed position is greater than the height of the adjustable railing in the stowed position.

EC 15. The cab guard system of any of the preceding or subsequent example combinations, wherein the adjustable railing is configured to couple with a lift system such that the adjustable railing is movable based on movement of the lift system.

EC 16. The cab guard system of any of the preceding or subsequent example combinations, wherein the base platform is configured to cover a cab of a vehicle.

EC 17. The cab guard system of any of the preceding or subsequent example combinations, further comprising an alarm system configured to provide an alert when the adjustable railing is in the stowed position.

EC 18. A cab guard assembly comprising: a base platform comprising a support surface; a mounting frame connected to the base platform and configured to connect the base platform to a vehicle; and an adjustable railing connected to the base platform, wherein the adjustable railing is movable between a stowed position and a deployed position, wherein a height of the adjustable railing in the deployed position is greater than the height of the adjustable railing in the stowed position, and wherein the adjustable railing is vertically offset from the support surface in the deployed position.

EC 19. The cab guard assembly of any of the preceding or subsequent example combinations, wherein the adjustable railing further comprises a top rail and a plurality of side rails supporting the top rail, and wherein the plurality of side rails are movably connected to the base platform.

EC 20. The cab guard assembly of any of the preceding or subsequent example combinations, wherein the adjustable railing extends around at least a portion of a perimeter of the support surface.

EC 21. An aerial device system comprising: an adjustable railing positionable around at least a portion of a base platform of the aerial device system, wherein the adjustable railing is movable between a stowed position and a deployed position, and wherein a height of the adjustable railing in the deployed position is greater than a height of the adjustable railing in the stowed position; and a coupler communicatively coupled to the adjustable railing, wherein the coupler is configured to detect a position of a component of an aerial device of the aerial device system and move the adjustable railing based on the detected position of the component of the aerial device being in a stowed position for the component of the aerial device or a deployed position for the component of the aerial device.

EC 22. The aerial device system of any of the preceding or subsequent example combinations, wherein the coupler comprises at least one of a proximity sensor, a force sensor, or a lever.

EC 23. The aerial device system of any of the preceding or subsequent example combinations, wherein the adjustable railing comprises side rails supporting a top rail, and wherein the side rails are adjustable such that the adjustable railing is movable between the stowed position and the deployed position.

EC 24. The aerial device system of any of the preceding or subsequent example combinations, wherein the coupler is configured to move the adjustable railing to the deployed position based on the detected position of the component of the aerial device being in the stowed position and move the adjustable railing to the stowed position based on the detected position of the component of the aerial device being in the deployed position.

EC 25. The aerial device system of any of the preceding or subsequent example combinations, wherein the coupler is communicatively coupled to the adjustable railing through a mechanical connection, an electrical connection, or a fluid connection.

EC 26. The aerial device system of any of the preceding or subsequent example combinations, wherein the coupler is communicatively coupled to the adjustable railing through a spring tensioned lever, a hydraulically activated hinge, a pneumatically activated hinge, or an electrically activated hinge.

EC 27. The aerial device system of any of the preceding or subsequent example combinations, further comprising an alarm device configured to generate an alert based on the adjustable railing being in the stowed position or the deployed position.

EC 28. An aerial device system comprising: a base platform comprising a support surface; and a cab guard safety system comprising: an adjustable railing extending around at least a portion of the base platform and movable between a stowed position and a deployed position, wherein a height of the adjustable railing relative to the support surface in the deployed position is greater than a height of the adjustable railing in the stowed position; and a coupler communicatively connected to the adjustable railing, wherein the coupler is configured to detect a position of a component of an aerial device of the aerial device system relative to the base platform and move the adjustable railing between the stowed position and the deployed position based on the position of the component of the aerial device.

EC 29. The aerial device system of any of the preceding or subsequent example combinations, wherein the component of the aerial device is a work device of the aerial device, and wherein the coupler is configured to position the adjustable railing based on the position of the work device relative to the base platform.

EC 30. The aerial device system of any of the preceding or subsequent example combinations, wherein the component of the aerial device is a boom of the aerial device, and wherein the coupler is configured to position the adjustable railing based on the position of the boom relative to the base platform.

EC 31. The aerial device system of any of the preceding or subsequent example combinations, wherein the coupler comprises at least one of a proximity sensor, a force sensor, or a lever.

EC 32. The aerial device system of any of the preceding or subsequent example combinations, wherein the coupler is communicatively coupled to the adjustable railing through a spring tensioned lever, a hydraulically activated hinge, a pneumatically activated hinge, or an electrically activated hinge.

EC 33. The aerial device system of any of the preceding or subsequent example combinations, wherein the coupler is on the base platform.

EC 34. The aerial device system of any of the preceding or subsequent example combinations, wherein the coupler is configured to move the adjustable railing to the deployed position when the detected position of the component of the aerial device is a stowed position and move the adjustable railing to the stowed position when the detected position of the component of the aerial device is a deployed position.

EC 35. A method of controlling a cab guard safety system comprising: detecting a position of a component of an aerial device relative to a base platform of an aerial device system with a coupler; and moving, by the coupler, an adjustable railing extending along at least a portion of a perimeter edge of the base platform to a deployed position or a stowed position based on the detected position of the component of the aerial device, wherein a height of the adjustable railing in the deployed position is greater than a height of the adjustable railing in the stowed position.

EC 36. The method of any of the preceding or subsequent example combinations, wherein moving the adjustable railing to the deployed position comprises: detecting whether the adjustable railing is in the deployed position; moving the adjustable railing to the deployed position based on the adjustable railing not being in the deployed position; detecting whether a boom of the aerial device is stowed while the adjustable railing is in the deployed position; and generating an alert with an alarm device based on the boom not being stowed while the adjustable railing is in the deployed position.

EC 37. The method of any of the preceding or subsequent example combinations, wherein the coupler is communicatively coupled to the adjustable railing through a mechanical connection, a fluid connection, or an electrical connection such that moving the adjustable railing to the deployed position or the stowed position comprises moving the adjustable railing through a mechanical control, fluid control, or electrical control.

EC 38. The method of any of the preceding or subsequent example combinations, wherein the coupler is a force sensor and the coupler detects the position of the component of the aerial device based on a force applied by the component of the aerial device on the coupler.

EC 39. The method of any of the preceding or subsequent example combinations, wherein the coupler is a proximity sensor and the coupler detects the position of the component of the aerial device based on a detected distance between the component of the aerial device and the coupler.

EC 40. The method of any of the preceding or subsequent example combinations, further comprising: detecting whether the aerial device is in a transport condition; and moving the adjustable railing to a transport position based on the aerial device being in the transport condition, wherein a height of the adjustable railing in the transport position is greater than the height of the adjustable railing in the stowed position and less than the height of the adjustable railing in the deployed position.

EC 41. The method of any of the preceding or subsequent example combinations, wherein moving the adjustable railing comprises: moving, by the coupler, the adjustable railing to the deployed position based on the detected position of the component of the aerial device being in a stowed position; and moving, by the coupler, the adjustable railing to a stowed position based on the detected position of the component of the aerial device being in a deployed position.

EC 42. An aerial device system where, using the assistance of spring tension, the boom/bucket/upper boom mounted unmanned mechanical device coming into contact with a lever raises the railings to the upright position as it comes to rest on the cab guard or cradle. In this design, the railings "shift" forward. The side rails remain equidistant from each other as they move forward, lowering the front railing. This allows the partial lowering of rails why vehicle is in motion if over height at full extension. A system may be integrated that allows for partial lowering during transport only. The system shall ensure that full deployment is activated prior to access/regress or inspection, maintenance or repair. A physical, tangible object like a flag or sign may be lowered via the railings or in tandem with the railings to give the driver/operators a visual warning that boom is not stowed properly for transport. An audible and/or visual electronic warning inside the cab may be activated when the railings are in the "stowed" position. This position is equated to the boom not being stowed for transport. This warning can be activated via switches/buttons or proximity sensors on the railings or cab guard.

EC 43. An aerial device system where, using the assistance of spring tension, the boom/bucket/upper boom mounted unmanned mechanical device coming into contact with a lever raises the railings to the upright position as it comes to rest on the cab guard. In this design, the front and side railings use a "scissor-lift" style mechanism to raise and lower. A system may be integrated that allows for partial lowering during transport only. The system shall ensure that full deployment is activated prior to access/regress or inspection, maintenance or repair. A physical, tangible object like a flag or sign may be lowered via the railings or in tandem with the railings to give the driver/operators a visual warning that boom is not stowed properly for transport. An audible and/or visual electronic warning inside the cab may be activated when the railings are in the "stowed" position. This position is equated to the boom not being stowed for transport. This warning can be activated via switches/buttons or proximity sensors on the railings or cab guard.

EC 44. An aerial device system where, using the assistance of spring tension, the boom/bucket/upper boom mounted unmanned mechanical device coming into contact with a lever raises the railings to the upright position as it comes to rest on the cab guard. In this design, the front and side railings slide straight down. This allows the partial lowering of rails while vehicle is in motion if over height at full extension. A system may be integrated that allows for partial lowering during transport only. The system shall ensure that full deployment is activated prior to access/regress or inspection, maintenance or repair. A physical, tangible object like a flag or sign may be lowered via the railings or in tandem with the railings to give the driver/operators a visual warning that boom is not stowed properly for transport. An audible and/or visual electronic warning inside the cab may be activated when the railings are in the "stowed" position. This position is equated to the boom not being stowed for transport. This warning can be activated via switches/buttons or proximity sensors on the railings or cab guard.

EC 45. An aerial device system where, using the assistance of spring tension, the boom/bucket/upper boom mounted unmanned mechanical device coming into contact with a lever raises the railings to the upright position as it comes to rest on the cab guard. In this design, the front and side railings are attached to telescoping uprights. This allows the partial lowering of rails while vehicle is in motion if over height at full extension. A system may be integrated that allows for partial lowering during transport only. The system shall ensure that full deployment is activated prior to access/regress or inspection, maintenance or repair. A physical, tangible object like a flag or sign may be lowered via the railings or in tandem with the railings to give the driver/operators a visual warning that boom is not stowed properly for transport. An audible and/or visual electronic warning inside the cab may be activated when the railings are in the "stowed" position. This position is equated to the boom not being stowed for transport. This warning can be activated via switches/buttons or proximity sensors on the railings or cab guard.

EC 46. An aerial device system where, using the assistance of spring tension, the boom/bucket/upper boom mounted unmanned mechanical device coming into contact with a lever raises the railings to the upright position as it comes to rest on the cab guard. In this design, the front and side railings fold outwards. They can stop at 90 degrees or could also fold a full 180, whichever is most viable. A physical, tangible object like a flag or sign may be lowered via the railings or in tandem with the railings to give the driver/operators a visual warning that boom is not stowed properly for transport. An audible and/or visual electronic warning inside the cab may be activated when the railings are in the "stowed" position. This position is equated to the boom not being stowed for transport. This warning can be activated via switches/buttons or proximity sensors on the railings or cab guard.

EC 47. An aerial device system where, using physical electronic activation or proximity sensor activation, the boom/bucket/upper boom mounted unmanned mechanical device coming to rest on the cradle or cab guard activates hydraulic hinges, lifts, or other motion devices. In this design, the railings "shift" forward. The side rails remain equidistant from each other as they move forward, lowering the front railing. This allows the partial lowering of rails while vehicle is in motion if over height at full extension. A system may be integrated that allows for partial lowering during transport only. The system shall ensure that full deployment is activated prior to access/regress or inspection, maintenance or repair. A physical, tangible object like a flag or sign may be lowered via the railings or in tandem with the railings to give the driver/operators a visual warning that boom is not stowed properly for transport. An audible and/or visual electronic warning inside the cab may be activated when the railings are in the "stowed" position. This position is equated to the boom not being stowed for transport. This warning can be activated via switches/buttons or proximity sensors on the railings or cab guard.

EC 48. An aerial device system where, using physical electronic activation or proximity sensor activation, the boom/bucket/upper boom mounted unmanned mechanical device coming to rest on the cradle or cab guard activates hydraulic hinges, lifts, or other motion devices. In this design, the front and side railings use a "scissor-lift" style mechanism to raise and lower. This allows the partial lowering of rails while vehicle is in motion if over height at full extension. A system may be integrated that allows for partial lowering during transport only. The system shall ensure that full deployment is activated prior to access/ regress or inspection, maintenance or repair. A physical, tangible object like a flag or sign may be lowered via the railings or in tandem with the railings to give the driver/ operators a visual warning that boom is not stowed properly for transport. An audible and/or visual electronic warning inside the cab may be activated when the railings are in the "stowed" position. This position is equated to the boom not being stowed for transport. This warning can be activated via switches/buttons or proximity sensors on the railings or cab guard.

EC 49. An aerial device system where, using physical electronic activation or proximity sensor activation, the boom/bucket/upper boom mounted unmanned mechanical device coming to rest on the cradle or cab guard activates hydraulic hinges, lifts, or other motion devices. In this design, the front and side railings slide straight down. This allows the partial lowering of rails while vehicle is in motion if over height at full extension. A system may be integrated that allows for partial lowering during transport only. The system shall ensure that full deployment is activated prior to access/regress or inspection, maintenance or repair. A physical, tangible object like a flag or sign may be lowered via the railings or in tandem with the railings to give the driver/ operators a visual warning that boom is not stowed properly for transport. An audible and/or visual electronic warning inside the cab may be activated when the railings are in the "stowed" position. This position is equated to the boom not being stowed for transport. This warning can be activated via switches/buttons or proximity sensors on the railings or cab guard.

EC 50. An aerial device system where, using physical electronic activation or proximity sensor activation, the boom/bucket/upper boom mounted unmanned mechanical device coming to rest on the cradle or cab guard activates hydraulic hinges, lifts, or other motion devices. In this design, the front and side railings are attached to telescoping uprights. This allows the partial lowering of rails while vehicle is in motion if over height at full extension. A system may be integrated that allows for partial lowering during transport only. The system shall ensure that full deployment is activated prior to access/regress or inspection, maintenance or repair. A physical, tangible object like a flag or sign may be lowered via the railings or in tandem with the railings to give the driver/operators a visual warning that boom is not stowed properly for transport. An audible and/or visual electronic warning inside the cab may be activated when the railings are in the "stowed" position. This position is equated to the boom not being stowed for transport. This warning can be activated via switches/buttons or proximity sensors on the railings or cab guard.

EC 51. An aerial device system where, using physical electronic activation or proximity sensor activation, the boom/bucket/upper boom mounted unmanned mechanical device coming to rest on the cradle or cab guard activates hydraulic hinges, lifts, or other motion devices. In this design, the front and side railings fold outwards. They can stop at 90 degrees or could also fold a full 180, whichever is most viable. A physical, tangible object like a flag or sign may be lowered via the railings or in tandem with the railings to give the driver/operators a visual warning that boom is not stowed properly for transport. An audible and/or visual electronic warning inside the cab may be activated when the railings are in the "stowed" position. This position is equated to the boom not being stowed for transport. This warning can be activated via switches/buttons or proximity sensors on the railings or cab guard.

EC 52. An aerial device system where, using physical electronic activation or proximity sensor activation, the boom/bucket/upper boom mounted unmanned mechanical device coming to rest on the cradle or cab guard activates pneumatic hinges, lifts, or other motion devices. (viable option on air brake equipped trucks or trucks with onboard air compressor). In this design, the railings "shift" forward. The side rails remain equidistant from each other as they move forward, lowering the front railing. This allows the partial lowering of rails while vehicle is in motion if over height at full extension. A system may be integrated that allows for partial lowering during transport only. The system shall ensure that full deployment is activated prior to access/ regress or inspection, maintenance or repair. A physical, tangible object like a flag or sign may be lowered via the railings or in tandem with the railings to give the driver/ operators a visual warning that boom is not stowed properly for transport. An audible and/or visual electronic warning inside the cab may be activated when the railings are in the "stowed" position. This position is equated to the boom not being stowed for transport. This warning can be activated via switches/buttons or proximity sensors on the railings or cab guard.

EC 53. An aerial device system where, using physical electronic activation or proximity sensor activation, the boom/bucket/upper boom mounted unmanned mechanical device coming to rest on the cradle or cab guard activates pneumatic hinges, lifts, or other motion devices. (viable option on air brake equipped trucks or trucks with onboard air compressor). In this design, the front and side railings use a "scissor-lift" style mechanism to raise and lower. This allows the partial lowering of rails while vehicle is in motion if over height at full extension. A system may be integrated that allows for partial lowering during transport only. The system shall ensure that full deployment is activated prior to access/regress or inspection, maintenance or repair. A physical, tangible object like a flag or sign may be lowered via the railings or in tandem with the railings to give the driver/operators a visual warning that boom is not stowed properly for transport. An audible and/or visual electronic warning inside the cab may be activated when the railings are in the "stowed" position. This position is equated to the boom not being stowed for transport. This warning can be activated via switches/buttons or proximity sensors on the railings or cab guard.

EC 54. An aerial device system where, using physical electronic activation or proximity sensor activation, the boom/bucket/upper boom mounted unmanned mechanical device coming to rest on the cradle or cab guard activates pneumatic hinges, lifts, or other motion devices. (viable option on air brake equipped trucks or trucks with onboard air compressor). In this design, the front and side railings slide straight down. This allows the partial lowering of rails while vehicle is in motion if over height at full extension. A system may be integrated that allows for partial lowering during transport only. The system shall ensure that full deployment is activated prior to access/regress or inspection, maintenance or repair. A physical, tangible object like a flag or sign may be lowered via the railings or in tandem with the railings to give the driver/operators a visual warning that boom is not stowed properly for transport. An audible and/or visual electronic warning inside the cab may be activated when the railings are in the "stowed" position. This position is equated to the boom not being stowed for transport. This warning can be activated via switches/buttons or proximity sensors on the railings or cab guard.

EC 55. An aerial device system where, using physical electronic activation or proximity sensor activation, the boom/bucket/upper boom mounted unmanned mechanical device coming to rest on the cradle or cab guard activates pneumatic hinges, lifts, or other motion devices. (viable option on air brake equipped trucks or trucks with onboard air compressor). In this design, the front and side railings are attached to telescoping uprights. This allows the partial lowering of rails while vehicle is in motion if over height at full extension. A system may be integrated that allows for partial lowering during transport only. The system shall ensure that full deployment is activated prior to access/regress or inspection, maintenance or repair. A physical, tangible object like a flag or sign may be lowered via the railings or in tandem with the railings to give the driver/operators a visual warning that boom is not stowed properly for transport. An audible and/or visual electronic warning inside the cab may be activated when the railings are in the "stowed" position. This position is equated to the boom not being stowed for transport. This warning can be activated via switches/buttons or proximity sensors on the railings or cab guard.

EC 56. An aerial device system where, using physical electronic activation or proximity sensor activation, the boom/bucket/upper boom mounted unmanned mechanical device coming to rest on the cradle or cab guard activates pneumatic hinges, lifts, or other motion devices. (viable option on air brake equipped trucks or trucks with onboard air compressor). In this design, the front and side railings fold outwards. They can stop at 90 degrees or could also fold a full 180, whichever is most viable. A physical, tangible object like a flag or sign may be lowered via the railings or in tandem with the railings to give the driver/operators a visual warning that boom is not stowed properly for transport. An audible and/or visual electronic warning inside the cab may be activated when the railings are in the "stowed" position. This position is equated to the boom not being stowed for transport. This warning can be activated via switches/buttons or proximity sensors on the railings or cab guard.

EC 57. An aerial device system where, using physical electronic activation or proximity sensor activation, the boom/bucket/upper boom mounted unmanned mechanical device coming to rest on the cradle or cab guard activates electric motorized hinges, lifts, or other motion devices. In this design, the railings "shift" forward. The side rails remain equidistant from each other as they move forward, lowering the front railing. This allows the partial lowering of rails while vehicle is in motion if over height at full extension. A system may be integrated that allows for partial lowering during transport only. The system shall ensure that full deployment is activated prior to access/regress or inspection, maintenance or repair. A physical, tangible object like a flag or sign may be lowered via the railings or in tandem with the railings to give the driver/operators a visual warning that boom is not stowed properly for transport. An audible and/or visual electronic warning inside the cab may be activated when the railings are in the "stowed" position. This position is equated to the boom not being stowed for transport. This warning can be activated via switches/buttons or proximity sensors on the railings or cab guard.

EC 58. An aerial device system where, using physical electronic activation or proximity sensor activation, the boom/bucket/upper boom mounted unmanned mechanical device coming to rest on the cradle or cab guard activates electric motorized hinges, lifts, or other motion devices. In this design, the front and side railings use a "scissor-lift" style mechanism to raise and lower. This allows the partial lowering of rails while vehicle is in motion if over height at full extension. A system may be integrated that allows for partial lowering during transport only. The system shall ensure that full deployment is activated prior to access/regress or inspection, maintenance or repair. A physical, tangible object like a flag or sign may be lowered via the railings or in tandem with the railings to give the driver/operators a visual warning that boom is not stowed properly for transport. An audible and/or visual electronic warning inside the cab may be activated when the railings are in the "stowed" position. This position is equated to the boom not being stowed for transport. This warning can be activated via switches/buttons or proximity sensors on the railings or cab guard.

EC 59. An aerial device system where, using physical electronic activation or proximity sensor activation, the boom/bucket/upper boom mounted unmanned mechanical device coming to rest on the cradle or cab guard activates electric motorized mechanisms. In this design, the front and side railings slide straight down. This allows the partial lowering of rails while vehicle is in motion if over height at full extension. A system may be integrated that allows for partial lowering during transport only. The system shall ensure that full deployment is activated prior to access/regress or inspection, maintenance or repair. A physical, tangible object like a flag or sign may be lowered via the railings or in tandem with the railings to give the driver/ operators a visual warning that boom is not stowed properly for transport. An audible and/or visual electronic warning inside the cab may be activated when the railings are in the "stowed" position. This position is equated to the boom not being stowed for transport. This warning can be activated via switches/buttons or proximity sensors on the railings or cab guard.

EC 60. An aerial device system where, using physical electronic activation or proximity sensor activation, the boom/bucket/upper boom mounted unmanned mechanical device coming to rest on the cradle or cab guard activates electric motorized mechanisms. In this design, the front and side railings are attached to telescoping uprights. This allows the partial lowering of rails while vehicle is in motion if over height at full extension. A system may be integrated that allows for partial lowering during transport only. The system shall ensure that full deployment is activated prior to access/regress or inspection, maintenance or repair. A physical, tangible object like a flag or sign may be lowered via the railings or in tandem with the railings to give the driver/operators a visual warning that boom is not stowed properly for transport. An audible and/or visual electronic warning inside the cab may be activated when the railings are in the "stowed" position. This position is equated to the boom not being stowed for transport. This warning can be activated via switches/buttons or proximity sensors on the railings or cab guard.

EC 61. An aerial device system where, using physical electronic activation or proximity sensor activation, the boom/bucket/upper boom mounted unmanned mechanical device coming to rest on the cradle or cab guard activates electric motorized hinges, lifts, or other motion devices. In this design, the front and side railings fold outwards. They can stop at 90 degrees or could also fold a full 180, whichever is most viable. A physical, tangible object like a flag or sign may be lowered via the railings or in tandem with the railings to give the driver/operators a visual warning that boom is not stowed properly for transport. An audible and/or visual electronic warning inside the cab may be activated when the railings are in the "stowed" position. This position is equated to the boom not being stowed for transport. This warning can be activated via switches/buttons or proximity sensors on the railings or cab guard.

EC 62. An aerial device system where, using the pressure of the boom/bucket/upper boom mounted unmanned mechanical device coming to rest on the cradle or cab guard, a pump is physically actuated, pressurizing hydraulic lines. This pressure is used to activate hydraulic powered hinges, lifts, or other motion devices. In this design, the railings "shift" forward. The side rails remain equidistant from each other as they move forward, lowering the front railing. This allows the partial lowering of rails while vehicle is in motion if over height at full extension. A system may be integrated that allows for partial lowering during transport only. The system shall ensure that full deployment is activated prior to access/regress or inspection, maintenance or repair. A physical, tangible object like a flag or sign may be lowered via the railings or in tandem with the railings to give the driver/operators a visual warning that boom is not stowed properly for transport. An audible and/or visual electronic warning inside the cab may be activated when the railings are in the "stowed" position. This position is equated to the boom not being stowed for transport. This warning can be activated via switches/buttons or proximity sensors on the railings or cab guard.

EC 63. An aerial device system where, using the pressure of the boom/bucket/upper boom mounted unmanned mechanical device coming to rest on the cradle or cab guard, a pump is physically actuated, pressurizing hydraulic lines. This pressure is used to activate hydraulic powered hinges, lifts, or other motion devices. In this design, the front and side railings use a "scissor-lift" style mechanism to raise and lower. This allows the partial lowering of rails while vehicle is in motion if over height at full extension. A system may be integrated that allows for partial lowering during transport only. The system shall ensure that full deployment is activated prior to access/regress or inspection, maintenance or repair. A physical, tangible object like a flag or sign may be lowered via the railings or in tandem with the railings to give the driver/operators a visual warning that boom is not stowed properly for transport. An audible and/or visual electronic warning inside the cab may be activated when the railings are in the "stowed" position. This position is equated to the boom not being stowed for transport. This warning can be activated via switches/buttons or proximity sensors on the railings or cab guard.

EC 64. An aerial device system where, using the pressure of the boom/bucket/upper boom mounted unmanned mechanical device coming to rest on the cradle or cab guard, a pump is physically actuated, pressurizing hydraulic lines. This pressure is used to activate hydraulic powered hinges, lifts, or other motion devices. In this design, the front and side railings slide straight down. This allows the partial lowering of rails while vehicle is in motion if over height at full extension. A system may be integrated that allows for partial lowering during transport only. The system shall ensure that full deployment is activated prior to access/regress or inspection, maintenance or repair. A physical, tangible object like a flag or sign may be lowered via the railings or in tandem with the railings to give the driver/operators a visual warning that boom is not stowed properly for transport. An audible and/or visual electronic warning inside the cab may be activated when the railings are in the "stowed" position. This position is equated to the boom not being stowed for transport. This warning can be activated via switches/buttons or proximity sensors on the railings or cab guard.

EC 65. An aerial device system where, using the pressure of the boom/bucket/upper boom mounted unmanned mechanical device coming to rest on the cradle or cab guard, a pump is physically actuated, pressurizing hydraulic lines. This pressure is used to activate hydraulic powered hinges, lifts, or other motion devices. In this design, the front and side railings are attached to telescoping uprights. This allows the partial lowering of rails while vehicle is in motion if over height at full extension. A system may be integrated that allows for partial lowering during transport only. The system shall ensure that full deployment is activated prior to access/regress or inspection, maintenance or repair. A physical, tangible object like a flag or sign may be lowered via the railings or in tandem with the railings to give the driver/operators a visual warning that boom is not stowed properly for transport. An audible and/or visual electronic warning inside the cab may be activated when the railings are in the "stowed" position. This position is equated to the boom not being stowed for transport. This warning can be activated via switches/buttons or proximity sensors on the railings or cab guard.

EC 66. An aerial device system where, using the pressure of the boom/bucket/upper boom mounted unmanned mechanical device coming to rest on the cradle or cab guard, a pump is physically actuated, pressurizing hydraulic lines. This pressure is used to activate hydraulic powered hinges, lifts, or other motion devices. In this design, the front and side railings fold outwards. They can stop at 90 degrees or could also fold a full 180, whichever is most viable. A physical, tangible object like a flag or sign may be lowered via the railings or in tandem with the railings to give the driver/operators a visual warning that boom is not stowed properly for transport. An audible and/or visual electronic warning inside the cab may be activated when the railings are in the "stowed" position. This position is equated to the boom not being stowed for transport. This warning can be activated via switches/buttons or proximity sensors on the railings or cab guard.

EC 67. An aerial device system where, using the pressure of the boom/bucket/upper boom mounted unmanned mechanical device coming to rest on the cradle or cab guard, a pump is physically actuated, pressurizing pneumatic lines. This pressure is used to activate pneumatic powered hinges, lifts, or other motion devices. In this design, the railings "shift" forward. The side rails remain equidistant from each other as they move forward, lowering the front railing. This allows the partial lowering of rails while vehicle is in motion if over height at full extension. A system may be integrated that allows for partial lowering during transport only. The system shall ensure that full deployment is activated prior to access/egress or inspection, maintenance or repair. A physical, tangible object like a flag or sign may be lowered via the railings or in tandem with the railings to give the driver/operators a visual warning that boom is not stowed properly for transport. An audible and/or visual electronic warning inside the cab may be activated when the railings are in the "stowed" position. This position is equated to the boom not being stowed for transport. This warning can be activated via switches/buttons or proximity sensors on the railings or cab guard.

EC 68. An aerial device system where, using the pressure of the boom/bucket/upper boom mounted unmanned mechanical device coming to rest on the cradle or cab guard, a pump is physically actuated, pressurizing pneumatic lines. This pressure is used to activate pneumatic powered hinges, lifts, or other motion devices. In this design, the front and side railings use a "scissor-lift" style mechanism to raise and lower. This allows the partial lowering of rails while vehicle is in motion if over height at full extension. A system may be integrated that allows for partial lowering during transport only. The system shall ensure that full deployment is activated prior to access/regress or inspection, maintenance or repair. A physical, tangible object like a flag or sign may be lowered via the railings or in tandem with the railings to give the driver/operators a visual warning that boom is not stowed properly for transport. An audible and/or visual electronic warning inside the cab may be activated when the railings are in the "stowed" position. This position is equated to the boom not being stowed for transport. This warning can be activated via switches/buttons or proximity sensors on the railings or cab guard.

EC 69. An aerial device system where, using the pressure of the boom/bucket/upper boom mounted unmanned mechanical device coming to rest on the cradle or cab guard, a pump is physically actuated, pressurizing pneumatic lines. This pressure is used to activate pneumatic powered hinges, lifts, or other motion devices. In this design, the front and side railings slide straight down. This allows the partial lowering of rails while vehicle is in motion if over height at full extension. A system may be integrated that allows for partial lowering during transport only. The system shall ensure that full deployment is activated prior to access/regress or inspection, maintenance or repair. A physical, tangible object like a flag or sign may be lowered via the railings or in tandem with the railings to give the driver/operators a visual warning that boom is not stowed properly for transport. An audible and/or visual electronic warning inside the cab may be activated when the railings are in the "stowed" position. This position is equated to the boom not being stowed for transport. This warning can be activated via switches/buttons or proximity sensors on the railings or cab guard.

EC 70. An aerial device system where, using the pressure of the boom/bucket/upper boom mounted unmanned mechanical device coming to rest on the cradle or cab guard, a pump is physically actuated, pressurizing pneumatic lines. This pressure is used to activate pneumatic powered hinges, lifts, or other motion devices. In this design, the front and side railings are attached to telescoping uprights. This allows the partial lowering of rails while vehicle is in motion if over height at full extension. A system may be integrated that allows for partial lowering during transport only. The system shall ensure that full deployment is activated prior to access/regress or inspection, maintenance or repair. A physical, tangible object like a flag or sign may be lowered via the railings or in tandem with the railings to give the driver/operators a visual warning that boom is not stowed properly for transport. An audible and/or visual electronic warning inside the cab may be activated when the railings are in the "stowed" position. This position is equated to the boom not being stowed for transport. This warning can be activated via switches/buttons or proximity sensors on the railings or cab guard.

EC 71. An aerial device system where, using the pressure of the boom/bucket/upper boom mounted unmanned mechanical device coming to rest on the cradle or cab guard, a pump is physically actuated, pressurizing pneumatic lines. This pressure is used to activate pneumatic powered hinges, lifts, or other motion devices. In this design, the front and side railings fold outwards. They can stop at 90 degrees or could also fold a full 180, whichever is most viable. A physical, tangible object like a flag or sign may be lowered via the railings or in tandem with the railings to give the driver/operators a visual warning that boom is not stowed properly for transport. An audible and/or visual electronic warning inside the cab may be activated when the railings are in the "stowed" position. This position is equated to the boom not being stowed for transport. This warning can be activated via switches/buttons or proximity sensors on the railings or cab guard.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed:

1. An aerial device system comprising:
   an adjustable railing positionable around at least a portion of a base platform of the aerial device system, wherein the adjustable railing is movable between a stowed position and a deployed position, and wherein a height of the adjustable railing in the deployed position is greater than a height of the adjustable railing in the stowed position; and a coupler communicatively coupled to the adjustable railing, wherein the coupler is configured to detect a position of a component of an aerial device of the aerial device system and move the adjustable railing based on the detected position of the component of the aerial device being in a stowed position for the component of the aerial device or a deployed position for the component of the aerial device.

2. The aerial device system of claim 1, wherein the coupler comprises at least one of a proximity sensor, a force sensor, or a lever.

3. The aerial device system of claim 1, wherein the adjustable railing comprises side rails supporting a top rail, and wherein the side rails are adjustable such that the adjustable railing is movable between the stowed position and the deployed position.

4. The aerial device system of claim 1, wherein the coupler is configured to move the adjustable railing to the deployed position based on the detected position of the component of the aerial device being in the stowed position and move the adjustable railing to the stowed position based on the detected position of the component of the aerial device being in the deployed position.

5. The aerial device system of claim 1, wherein the coupler is communicatively coupled to the adjustable railing through a mechanical connection, an electrical connection, or a fluid connection.

6. The aerial device system of claim 1, wherein the coupler is communicatively coupled to the adjustable railing through a spring tensioned lever, a hydraulically activated hinge, a pneumatically activated hinge, or an electrically activated hinge.

7. The aerial device system of claim 1, further comprising an alarm device configured to generate an alert based on the adjustable railing being in the stowed position or the deployed position.

8. An aerial device system comprising:
a base platform comprising a support surface; and
a cab guard safety system comprising:
an adjustable railing extending around at least a portion of the base platform and movable between a stowed position and a deployed position, wherein a height of the adjustable railing relative to the support surface in the deployed position is greater than a height of the adjustable railing in the stowed position; and
a coupler communicatively connected to the adjustable railing, wherein the coupler is configured to detect a position of a component of an aerial device of the aerial device system relative to the base platform and move the adjustable railing between the stowed position and the deployed position based on the position of the component of the aerial device.

9. The aerial device system of claim 8, wherein the component of the aerial device is a work device of the aerial device, and wherein the coupler is configured to position the adjustable railing based on the position of the work device relative to the base platform.

10. The aerial device system of claim 8, wherein the component of the aerial device is a boom of the aerial device, and wherein the coupler is configured to position the adjustable railing based on the position of the boom relative to the base platform.

11. The aerial device system of claim 8, wherein the coupler comprises at least one of a proximity sensor, a force sensor, or a lever.

12. The aerial device system of claim 8, wherein the coupler is communicatively coupled to the adjustable railing through a spring tensioned lever, a hydraulically activated hinge, a pneumatically activated hinge, or an electrically activated hinge.

13. The aerial device system of claim 8, wherein the coupler is on the base platform.

14. The aerial device system of claim 8, wherein the coupler is configured to move the adjustable railing to the deployed position when the detected position of the component of the aerial device is a stowed position of the component of the aerial device and move the adjustable railing to the stowed position when the detected position of the component of the aerial device is a deployed position of the component of the aerial device.

15. A method of controlling a cab guard safety system comprising:
detecting a position of a component of an aerial device relative to a base platform of an aerial device system with a coupler; and
moving, by the coupler, an adjustable railing extending along at least a portion of a perimeter edge of the base platform to a deployed position or a stowed position based on the detected position of the component of the aerial device, wherein a height of the adjustable railing in the deployed position is greater than a height of the adjustable railing in the stowed position.

16. The method of claim 15, wherein moving the adjustable railing comprises:
moving, by the coupler, the adjustable railing to the deployed position based on the detected position of the component of the aerial device being in a stowed position; and
moving, by the coupler, the adjustable railing to a stowed position based on the detected position of the component of the aerial device being in a deployed position.

17. The method of claim 15, wherein the coupler is communicatively coupled to the adjustable railing through a mechanical connection, a fluid connection, or an electrical connection such that moving the adjustable railing to the deployed position or the stowed position comprises moving the adjustable railing through a mechanical control, fluid control, or electrical control.

18. The method of claim 15, wherein the coupler is a force sensor and the coupler detects the position of the component of the aerial device based on a force applied by the component of the aerial device on the coupler.

19. The method of claim 15, wherein the coupler is a proximity sensor and the coupler detects the position of the component of the aerial device based on a detected distance between the component of the aerial device and the coupler.

20. The method of claim 15, further comprising:
detecting whether the aerial device is in a transport condition; and
moving the adjustable railing to a transport position based on the aerial device being in the transport condition, wherein a height of the adjustable railing in the transport position is greater than the height of the adjustable railing in the stowed position and less than the height of the adjustable railing in the deployed position.

* * * * *